*US009046133B2*

United States Patent
Marion (12)

(10) Patent No.: US 9,046,133 B2
(45) Date of Patent: Jun. 2, 2015

(54) DECOUPLER ASSEMBLY HAVING LIMITED OVERRUNNING CAPABILITY

(75) Inventor: Patrick Marion, Toronto (CA)

(73) Assignee: LITENS AUTOMOTIVE PARTNERSHIP, Woodbridge (CA)

( * ) Notice: Subject to any disclaimer, the term of this patent is extended or adjusted under 35 U.S.C. 154(b) by 169 days.

(21) Appl. No.: 13/877,604

(22) PCT Filed: Nov. 8, 2011

(86) PCT No.: PCT/CA2011/001245
§ 371 (c)(1),
(2), (4) Date: Apr. 3, 2013

(87) PCT Pub. No.: WO2012/061930
PCT Pub. Date: May 18, 2012

(65) Prior Publication Data
US 2013/0237351 A1 Sep. 12, 2013

Related U.S. Application Data

(60) Provisional application No. 61/411,493, filed on Nov. 9, 2010.

(51) Int. Cl.
*F16D 3/00* (2006.01)
*F16H 55/14* (2006.01)
(Continued)

(52) U.S. Cl.
CPC . *F16D 7/00* (2013.01); *B60K 25/02* (2013.01); *B60K 2025/022* (2013.01);
(Continued)

(58) Field of Classification Search
CPC ... F16H 55/36; F16H 2055/366; F16H 55/14; F16H 7/1218; F16F 15/1442
USPC ...................................................... 474/74, 94
See application file for complete search history.

(56) References Cited

U.S. PATENT DOCUMENTS 3,019,871 A * 2/1962 Sauzedde ..................... 192/41 R
6,083,130 A * 7/2000 Mevissen et al. .............. 474/70
(Continued)

FOREIGN PATENT DOCUMENTS

CA 2288748 A1 11/1998
WO 2009118834 A1 10/2009

OTHER PUBLICATIONS

PCT/CA2011/001245, Search Report, Jan. 10, 2012.

*Primary Examiner* — Henry Liu
(74) *Attorney, Agent, or Firm* — Millman IP Inc.

(57) ABSTRACT

In one aspect, a decoupler assembly is provided for use between a shaft and an endless drive member that is used to drive the shaft. The decoupler assembly includes a pulley, a hub and an isolator spring that is preferably a coiled torsion spring. The two ends of the spring are engageable, at least indirectly, with the pulley and the hub for the transfer of torque therebetween. At least one of the ends of the spring engages an engagement structure (on either the pulley or the hub) that includes a helical axial shoulder and a driver wall. The spring transfers torque in one direction through the driver wall (e.g. when the pulley overruns the hub), but the spring end is not fixedly connected to the driver wall. When the hub overruns the pulley, there is relative rotation between the spring and whichever of the hub and pulley it is not fixedly connected to. Accordingly, there is relative rotation between the spring end and the helical axial shoulder and the driver wall. This causes the spring end to separate from the driver wall and ride up the helical axial shoulder. This causes the spring to compress axially. The spring coils have a selected amount of spacing so that the spring can be compressed by a selected amount axially. This sets the amount of relative rotation (and the amount of overrun) that is available between the pulley and the hub in the situation when the hub overruns the pulley.

17 Claims, 18 Drawing Sheets

(51) Int. Cl.

| | | |
|---|---|---|
| *F16H 55/36* | (2006.01) | |
| *F16D 7/00* | (2006.01) | |
| *B60K 25/02* | (2006.01) | |
| *F16D 3/10* | (2006.01) | |
| *F16D 3/12* | (2006.01) | |
| *F16D 41/20* | (2006.01) | |
| *F02B 67/06* | (2006.01) | |

(52) U.S. Cl.
CPC .................. *F02B 67/06* (2013.01); *F16D 3/10* (2013.01); *F16D 3/12* (2013.01); *F16D 41/206* (2013.01); *F16H 55/36* (2013.01); *F16H 2055/363* (2013.01)

(56) References Cited

U.S. PATENT DOCUMENTS

| | | | |
|---|---|---|---|
| 6,394,247 B1* | 5/2002 | Monahan et al. | 192/41 S |
| 7,153,227 B2* | 12/2006 | Dell et al. | 474/70 |
| 7,712,592 B2* | 5/2010 | Jansen et al. | 192/41 S |
| 7,891,475 B2* | 2/2011 | Zhu et al. | 192/54.5 |
| 7,972,231 B2* | 7/2011 | Kawamoto et al. | 474/70 |
| 8,021,253 B2* | 9/2011 | Dell et al. | 474/74 |
| 2005/0250607 A1* | 11/2005 | Jansen et al. | 474/74 |
| 2007/0037644 A1* | 2/2007 | Mevissen et al. | 474/70 |
| 2008/0108442 A1* | 5/2008 | Jansen et al. | 464/54 |
| 2011/0065537 A1* | 3/2011 | Serkh et al. | 474/94 |
| 2013/0217524 A1* | 8/2013 | Antchak et al. | 474/94 |

* cited by examiner

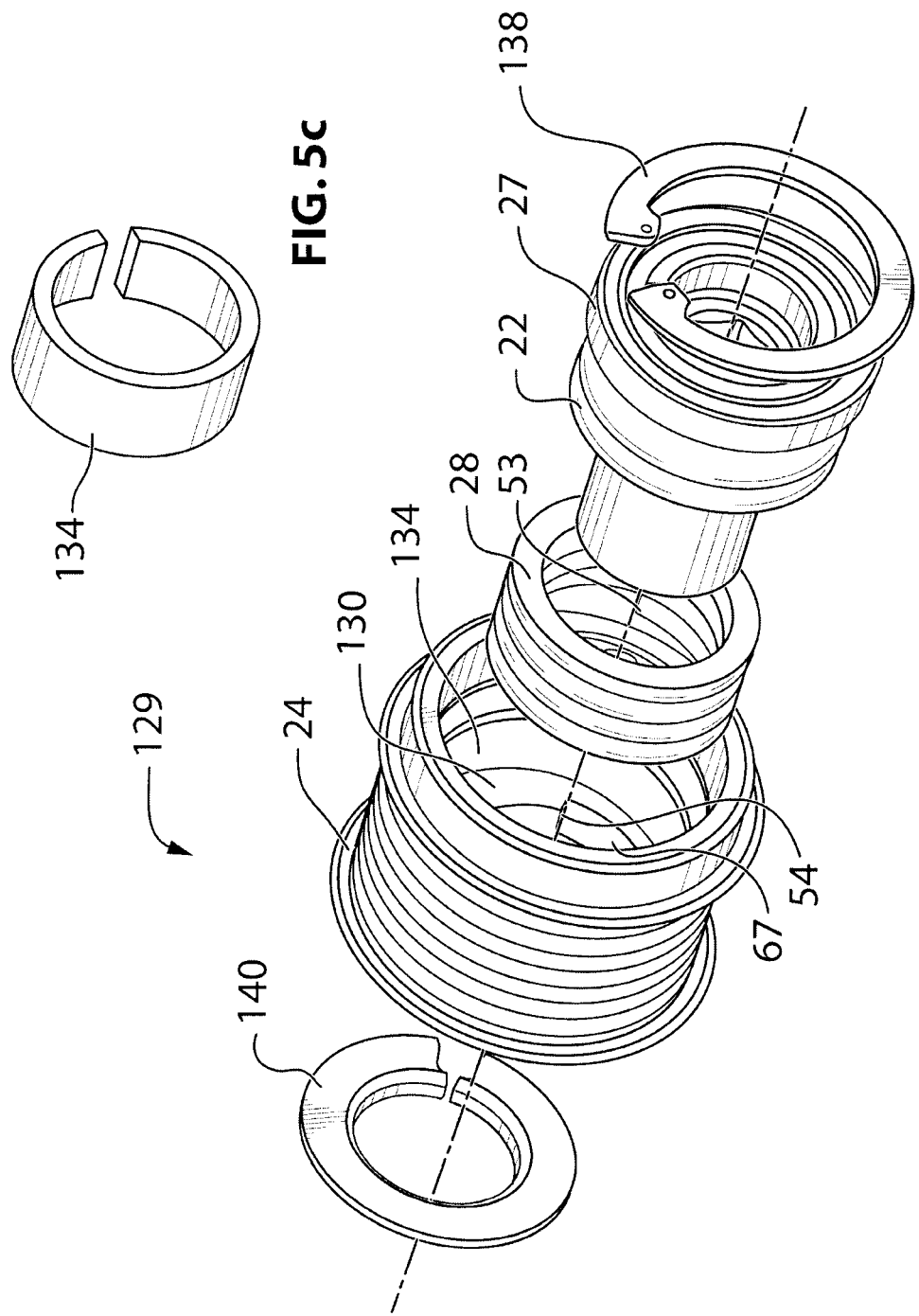

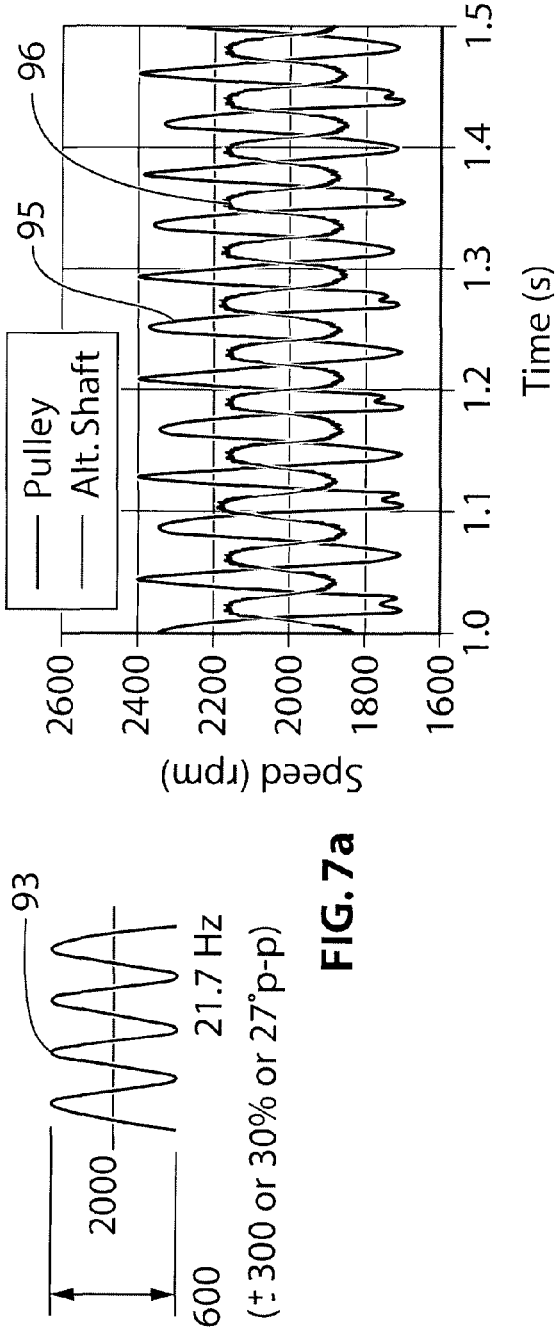
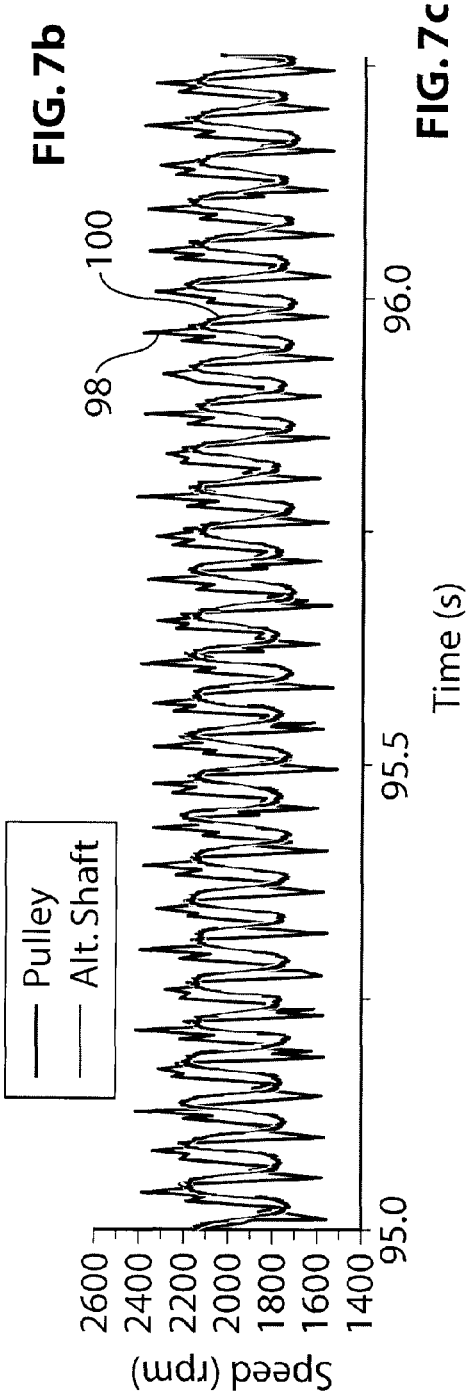
FIG. 7a
FIG. 7b
FIG. 7c

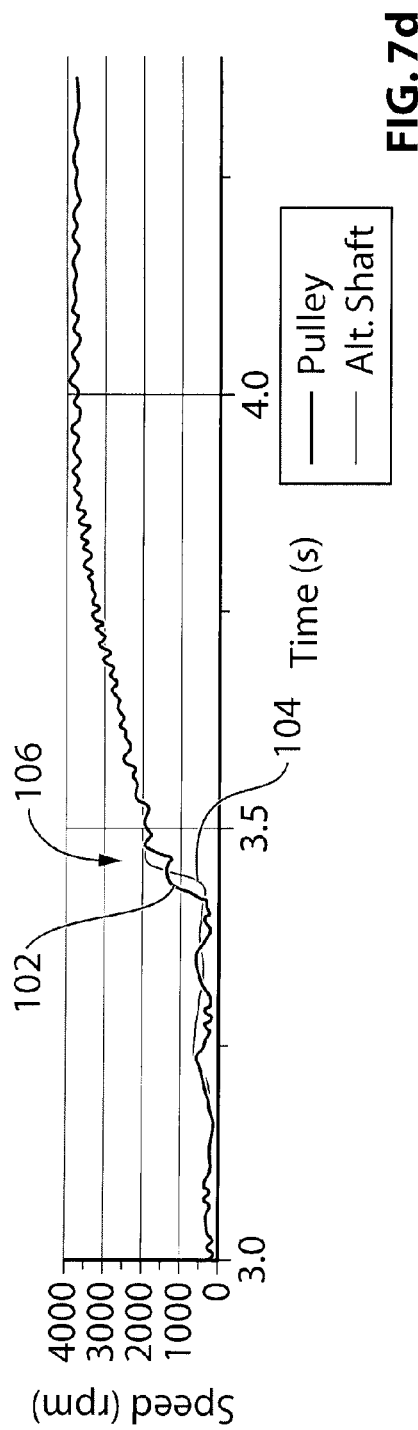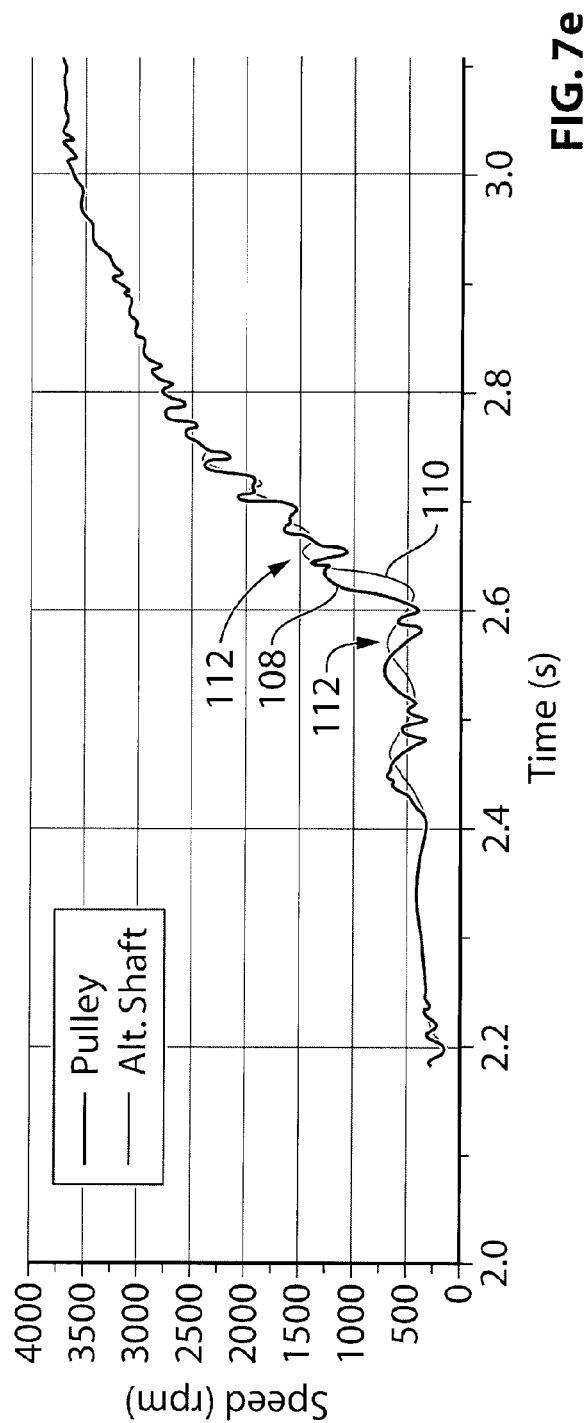
FIG. 7d
FIG. 7e

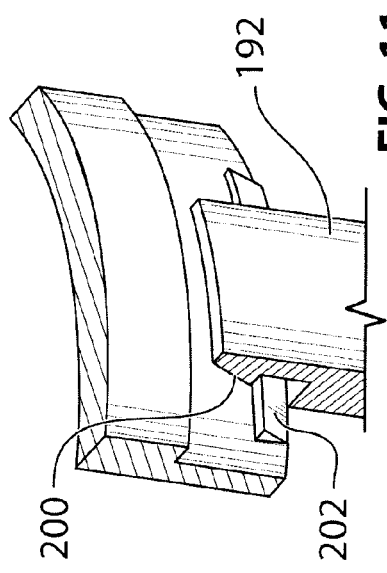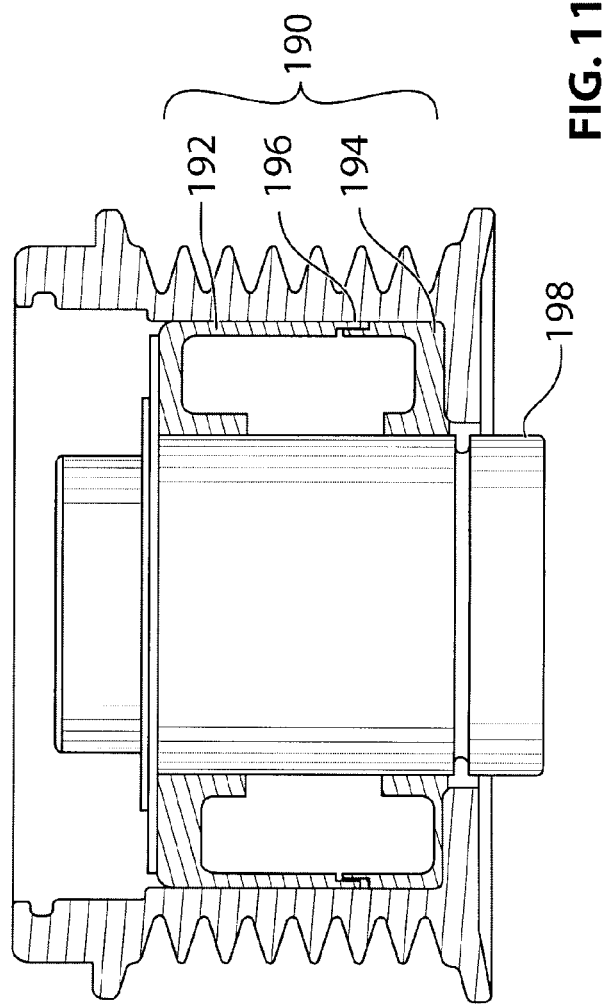

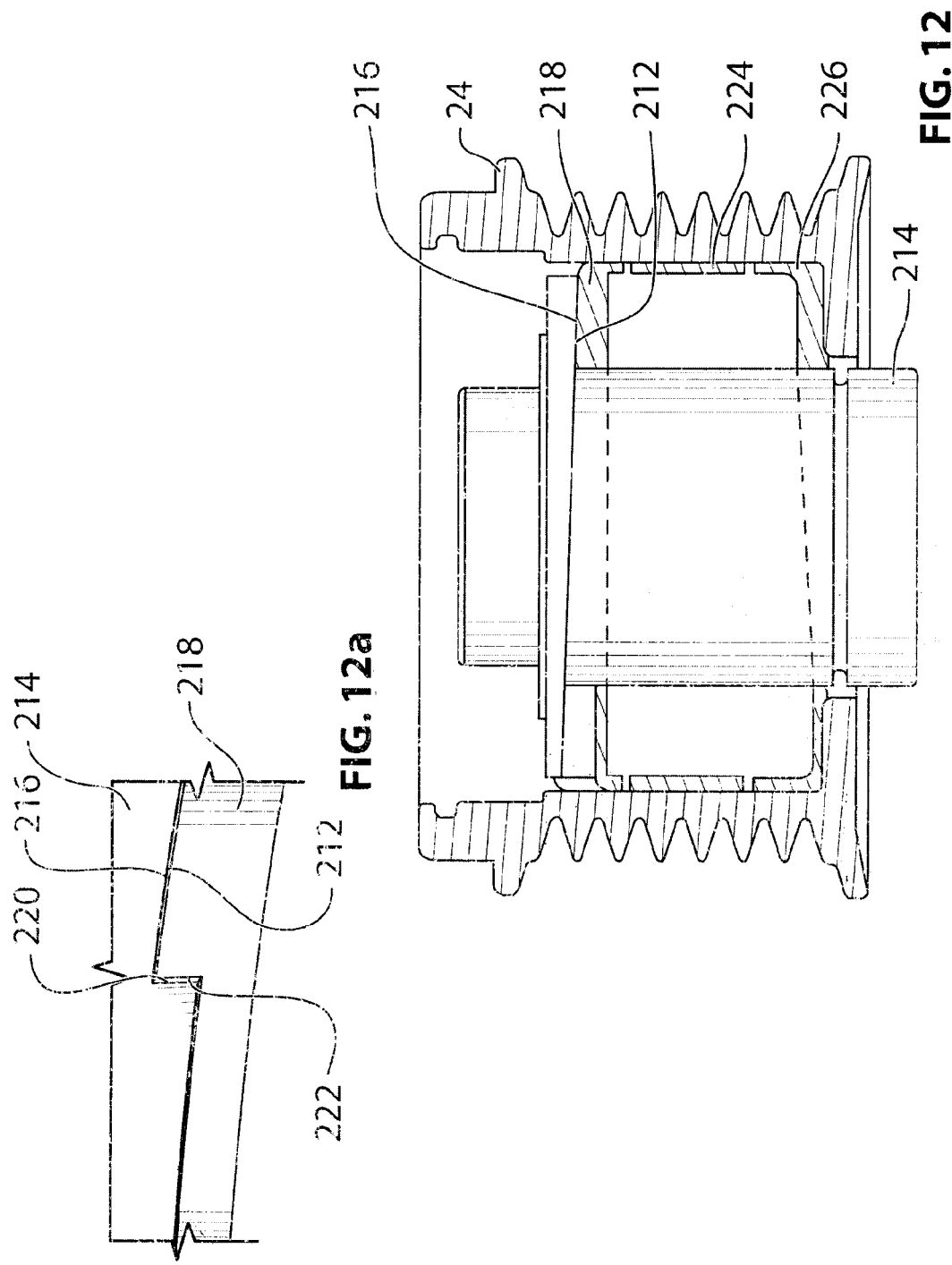

DECOUPLER ASSEMBLY HAVING LIMITED OVERRUNNING CAPABILITY

CROSS REFERENCE TO RELATED APPLICATIONS

This application is a national phase entry application of PCT/CA2011/001245, filed Nov. 8, 2011, which claims the benefit of: U.S. Provisional Application No. 61/411,493, filed Nov. 9, 2010.

FIELD OF THE INVENTION

The present invention relates to decoupler assemblies and more particularly to decoupler assemblies for alternators.

BACKGROUND OF THE INVENTION

It is known to provide a decoupling mechanism on an accessory, such as an alternator, that is driven by a belt from an engine in a vehicle. Such a decoupling mechanism, which may be referred to as a decoupler, permits the associated accessory to operate temporarily at a speed that is different than the speed of the belt. For example, when there is a sudden stoppage of the belt when the belt was running and driving rotation of the alternator shaft, the decoupler permits the alternator shaft to continue rotating temporarily as a result of inertia until it decelerates to a stop as a result of drag, thereby reducing the stress on the alternator shaft. As another example, the decoupler permits the alternator shaft to rotate at a relatively constant speed even though the crankshaft from the engine undergoes a cycle of decelerations and accelerations associated with the movement of the pistons.

Such a decoupler is a valuable additions to the powertrain of the vehicle. However, it can be costly to manufacture for various reasons. One example that drives up its cost is the pulley that is included with it. In certain decouplers the pulley is typically made from steel because it is engaged with the wrap spring that is in the decoupler. The pulley may have to coated for appearance reasons. The interior surface of the pulley, however, is machined to have selected dimensions with very tight tolerances to provide predictability in its engagement with the wrap spring. Thus, coatings, which typically have a relatively high variability in their thickness, cannot typically be applied to its interior surface that engages the wrap spring. Thus the coating process is made more difficult and expensive than it would otherwise be. Additionally, the coating itself can be prone to scratches, which could cause the entire decoupler to be rejected upon inspection.

Other problems arise when a decoupler with a wrap spring is used in conjunction with a BAS (Belt-Alternator-Start) system on a vehicle. In such a system, the alternator is driven as a motor and is used to drive the belt, so that the belt drives the engine's crankshaft, in order to start the engine. The wrap spring, however, prevents the alternator shaft from driving the pulley however, and so a separate electric clutch has been proposed to overcome this issue. Such clutches are expensive and complex however.

There is a continuing need to reduce their cost, to improve their operating life, to reduce their complexity and to simplify their manufacture. It would thus be beneficial to provide a decoupler that addresses one or more of these continuing needs.

SUMMARY OF THE INVENTION

In a first aspect, the invention is directed to a decoupler assembly for use between a rotating member such as an alternator shaft and a belt or other endless drive member that is used to drive the rotating member. The decoupler assembly includes a pulley, a hub and an isolator spring that is preferably a coiled, torsion spring. The two ends of the spring are engageable with, at least indirectly, the pulley and the hub for the transfer of torque therebetween. At least one of the ends of the spring engages an engagement structure (on either the pulley or the hub) that includes a helical axial shoulder and a driver wall. The spring transfers torque in one direction through the driver wall (e.g. when the pulley overruns the hub), but the spring end is not fixedly connected to the driver wall. As a result, when the hub overruns the pulley, there is relative rotation between the spring and whichever of the hub and pulley it is not fixedly connected to. Accordingly, there is relatively rotation between the spring end and the engagement structure (i.e. the helical axial shoulder and the driver wall). This causes the spring end to separate from the driver wall and to ride up the helical axial shoulder. This causes the spring to compress axially. The coils of the spring have a selected amount of spacing so that the spring can be compressed by a selected amount axially. This sets the amount of relative rotation (and therefore the amount of overrun) that is available between the pulley and the hub in that situation (e.g. in the situation when the hub overruns the pulley).

In a particular embodiment of the first aspect, the invention is directed to a decoupler assembly for transferring torque between a shaft and an endless drive member. The decoupler assembly includes a hub that is adapted to be coupled to the shaft such that the shaft co-rotates with the hub about a rotational axis, a pulley rotatably coupled to the hub, and having an outer periphery that is adapted to engage the endless drive member, a helical torsion spring concentric with the rotational axis and having a first axial face and a second axial face, and having a plurality of coils which are spaced apart by a plurality of gaps, a first engagement structure positioned between the torsion spring and one of the hub and the pulley, and a second engagement structure positioned between the torsion spring and the other of the hub and the pulley. The first engagement structure includes a helical first axial shoulder for engaging the first axial face of the torsion spring. The second engagement structure includes a second axial shoulder engageable with the second axial face of the torsion spring. Rotation of the pulley in a first rotational direction relative to the hub drives rotation of the hub through the torsion spring. Rotation of the hub in the first direction relative to the pulley generates relative rotation between the torsion spring and the helical first axial shoulder which causes axial compression of the torsion spring between the first and second axial shoulders, wherein the plurality of gaps are sized to provide a selected amount of axial compression of the torsion spring.

The decoupler assembly may be used as part of a BAS (Belt-Alternator-Start) system for a vehicle. In an embodiment, the vehicle includes an engine that has crankshaft, a crankshaft pulley, and a belt that is engaged with the crankshaft pulley and with an alternator. The BAS system includes a decoupler assembly mountable to the shaft of the alternator. The decoupler assembly includes a hub that is adapted to be coupled to the shaft such that the shaft co-rotates with the hub about a rotational axis, a pulley rotatably coupled to the hub, and having an outer periphery that is adapted to engage the endless drive member, a helical torsion spring concentric with the rotational axis and having a first axial face and a second axial face, and having a plurality of coils which are spaced apart by a plurality of gaps, a first engagement structure positioned between the torsion spring and one of the hub and the pulley, and a second engagement structure positioned between the torsion spring and the other of the hub and the pulley. The first engagement structure includes a helical first axial shoulder for engaging the first axial face of the torsion spring. The second engagement structure includes a second axial shoulder engageable with the second axial face of the torsion spring. Rotation of the pulley in a first rotational direction relative to the hub drives rotation of the hub through the torsion spring. Rotation of the hub in the first direction relative to the pulley generates relative rotation between the torsion spring and the helical first axial shoulder which causes axial compression of the torsion spring between the first and second axial shoulders. The plurality of gaps are sized to provide a selected amount of axial compression of the torsion spring. The selected amount of compression of the torsion spring is reached in less than 360 degrees of rotation of the hub relative to the pulley.

BRIEF DESCRIPTION OF THE DRAWINGS

The present invention will now be described, by way of example only, with reference to the attached drawings, in which:

FIG. 5a is a perspective exploded view of a decoupler assembly in accordance with an alternative embodiment of the present invention;

FIG. 5b is a sectional side view of the decoupler assembly shown in FIG. 5a;

FIG. 5c is a perspective view of a sleeve that is part of the decoupler assembly shown in FIG. 5a;

FIG. 7a-7g are curves illustrating tests and results of tests conducted on a prior art decoupler assembly with a wrap spring clutch and on a decoupler assembly in accordance with an embodiment of the present invention;

FIG. 8b is a sectional side view of the decoupler assembly shown in FIG. 8a;

FIG. 11 is a sectional side view of a cartridge for use with a decoupler assembly in accordance with an alternative embodiment of the present invention;

FIG. 11a is a perspective view of a detail of the cartridge shown in FIG. 11;

FIG. 12 is a sectional side view of a decoupler assembly in accordance with an alternative embodiment of the present invention; and FIG. 12a is a perspective view of a detail of the decoupler assembly shown in FIG. 12.

DETAILED DESCRIPTION OF THE INVENTION

Figure 1:
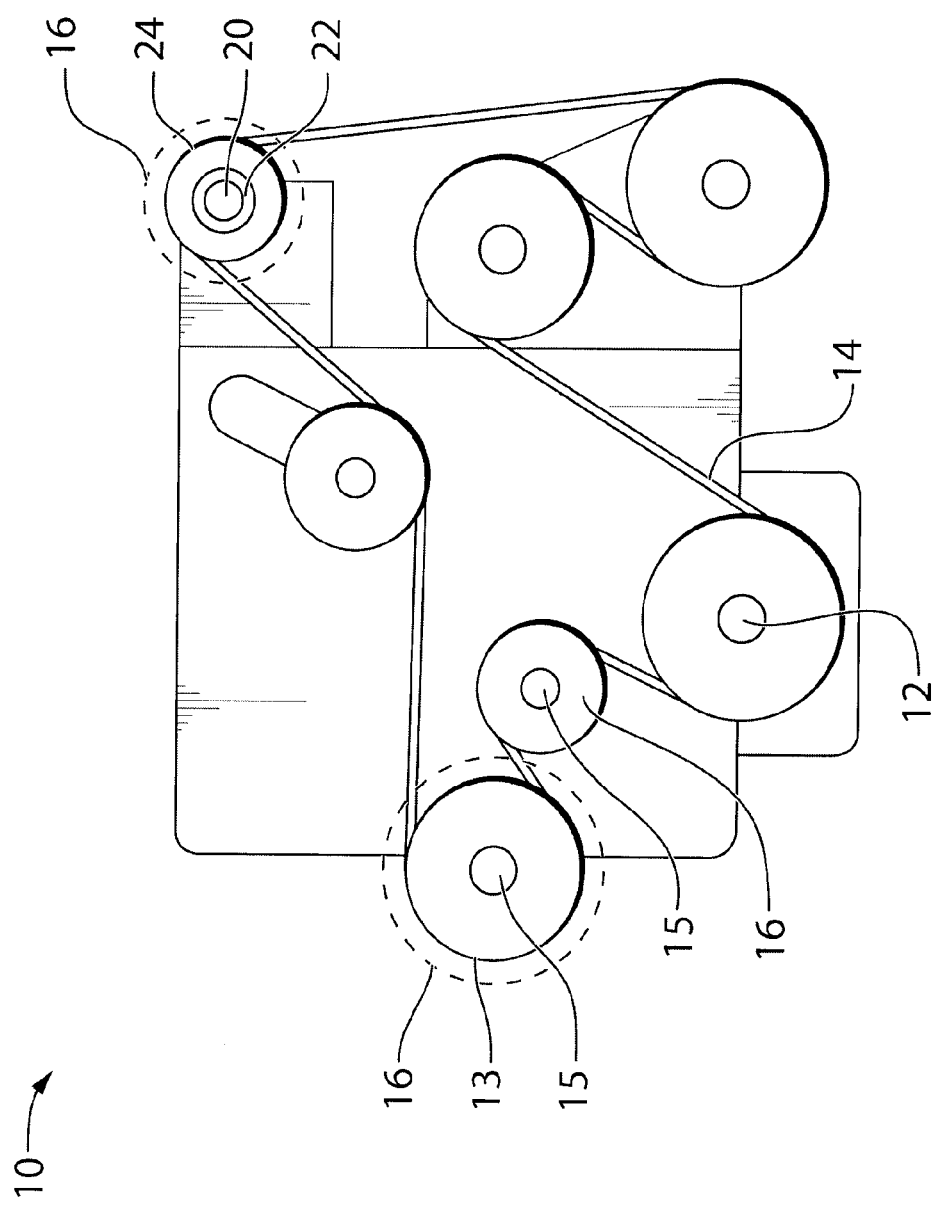
FIG. 1 is an elevation view of an engine having an accessory drive belt, a plurality of accessories and a decoupler assembly in accordance with an embodiment of the present invention.

Reference is made to FIG. 1, which shows an engine 10 for a vehicle. The engine 10 includes a crankshaft 12 which drives an endless drive element, which may be, for example, a belt 14. Via the belt 14, the engine 10 drives a plurality of accessories 16 (shown in dashed outlines), such as an alternator and a compressor. Each accessory 16 includes an input drive shaft 15 with a pulley 13 thereon, which is driven by the belt 14. A decoupler assembly 20 is provided instead of a pulley, between the belt 14 and the input shaft 15 of any one or more of the belt driven accessories 16. The decoupler assembly 20 transfers torque between the belt 14 and the shaft 15 but automatically decouples the shaft 15 from the belt 14 when the belt 14 decelerates relative to the shaft 15. Additionally, the decoupler assembly 20 allows the speed of the belt 14 to oscillate relative to the shaft 15. Thus, oscillations in the belt speed that are the result of oscillations in the speed of the crankshaft (an inherent property of internal combustion piston engines), are dampened by the decoupler assembly 20, and as a result, the stresses that would otherwise be incurred by the shaft 15 and the component 16 are reduced.

Figure 2:
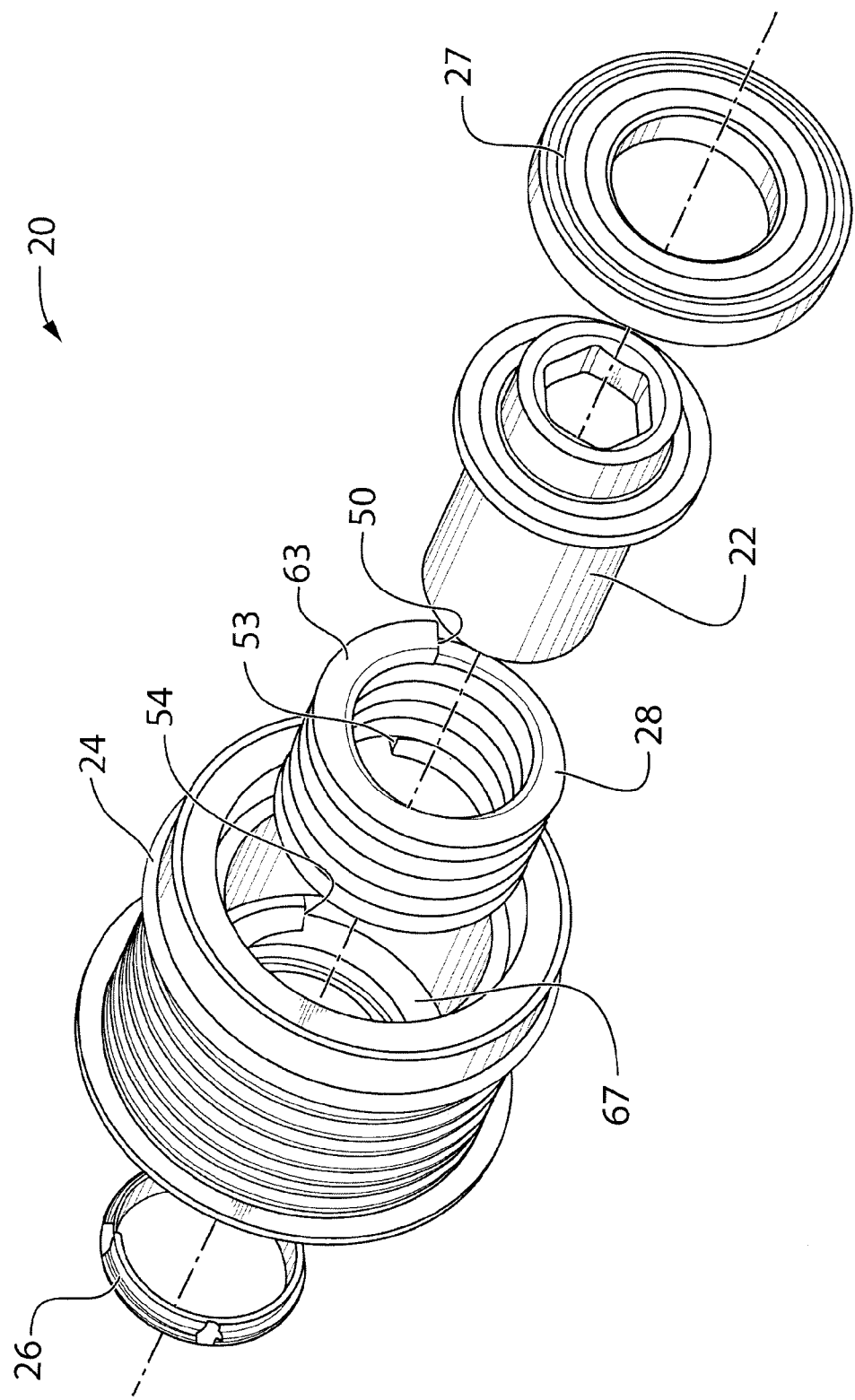
FIG. 2 is a perspective exploded view of the decoupler assembly shown in FIG. 1.
Figure 3:
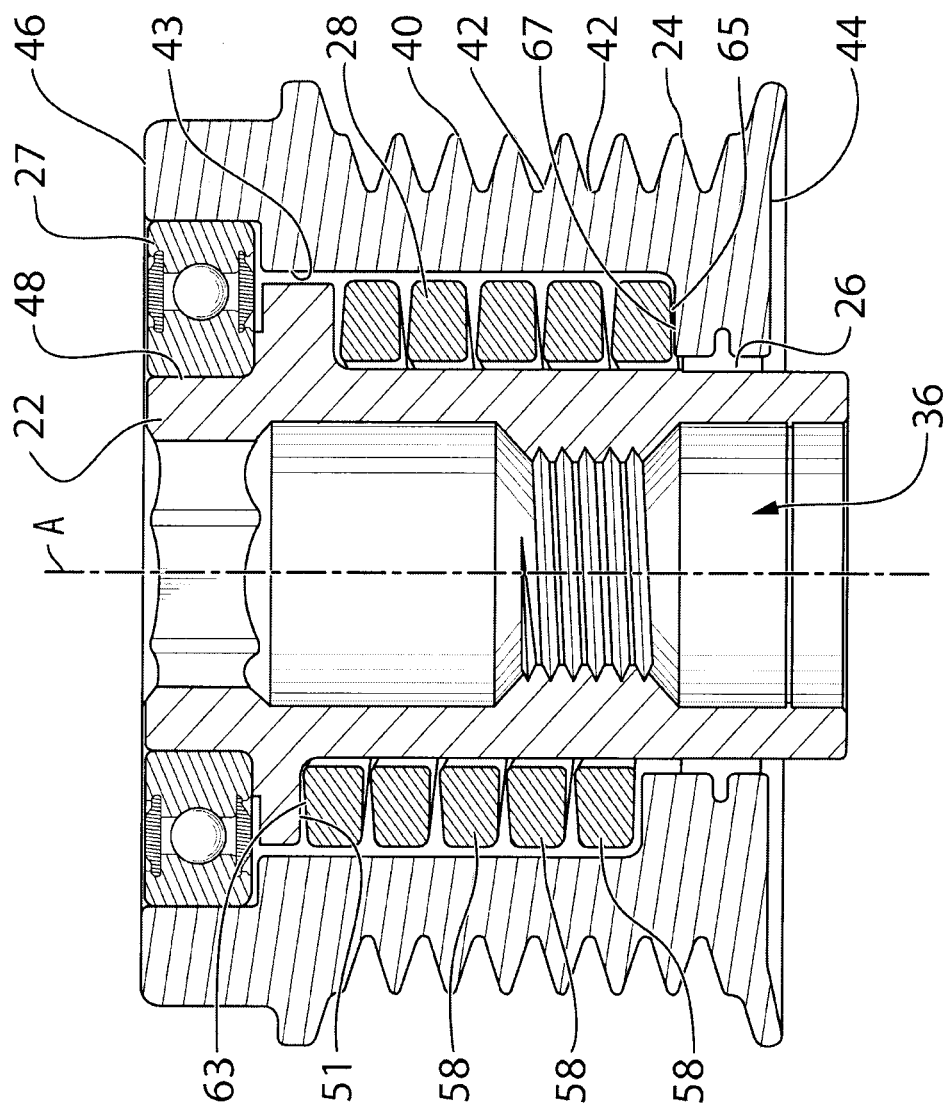
FIG. 3 is a sectional side view of the decoupler assembly shown in FIG. 1.

Referring to FIGS. 2 and 3, the decoupler assembly 20 includes a hub 22, a pulley 24, a first bearing member 26, a second bearing member 27, and an isolation spring 28.

The hub 22 may be adapted to mount to the accessory shaft 15 (FIG. 1) in any suitable way. For example, the hub 22 may have a shaft-mounting aperture 36 therethrough that is used for the mounting of the hub 22 to the end of the shaft 15, for co-rotation of the hub 22 and the shaft 15 about an axis A.

The pulley 24 is rotatably coupled to the hub 22. The pulley 24 has an outer surface 40 which is configured to engage the belt 14. The outer surface 40 is shown as having grooves 42. The belt 14 may thus be a multiple-V belt. It will be understood however, that the outer surface 40 of the pulley 24 may have any other suitable configuration and the belt 14 need not be a multiple-V belt. For example, the pulley 24 could have a single groove and the belt 14 could be a single V belt, or the pulley 24 may have a generally flat portion for engaging a flat belt 14. The pulley 24 further includes an inner surface 43. Unlike some decoupler assemblies of the prior art, the inner surface 43 of the pulley 24 does not engage a one-way clutch spring and as a result, the pulley 24 need not be made of a material that resists galling or wear from such a clutch spring. The pulley 24 may thus be made from any suitable material, such as a polymeric material, such as a type of phenolic, or an up to 50% glass-reinforced nylon-6. As a result, the pulley can be injection molded, and can easily have any suitable finish provided on it. Furthermore, the material can be of a selected colour, so that the pulley is a selected colour for appearance purposes, without the need for paint. Paint or some similar coating is needed for metallic pulleys, however it is susceptible to scratches which can reveal the base material underneath, leading to a rejection of the assembly during the inspection process. A polymeric pulley, however, even if scratched, remains the same colour since the colour extends throughout it, therefore making it less susceptible to rejection from being scratched. This reduced potential for rejection reduces the overall average cost of manufacture of the pulley. Furthermore, a polymeric pulley 24 can be significantly less expensive to manufacture than a coated steel pulley due to lower cost of materials, elimination of the coating step. Additionally, because the pulley 24 is not engaged with a wrap spring, the inner surface 43 of the pulley 24 need not be formed with very tight tolerances. By contrast, pulleys of the prior art that directly engage a clutch spring can in some cases require strict dimensional control on the pulley inner surface that engages the clutch spring so that the clutch spring operates as intended.

The pulley 24 may nonetheless be made from a metallic material, such as a steel, or aluminum. Even when made from steel, however, the pulley 24 may be less expensive then some pulleys of the prior art used in decoupler assemblies. For example, the pulley 24 may be made from a spinning and forming process as necessary to achieve a pulley shape. Such as pulley is described in U.S. Pat. No. 4,273,547.

Whether made from a polymeric material, or a metallic material the pulley 24 may be lighter than some pulleys of the prior art because it is not required to withstand the stresses associated with engagement with a wrap spring. Furthermore, it is not required to have the tight tolerances associated with some pulleys of the prior art, and so wall thicknesses and the like may be selected with the goal of lightness and with less emphasis on ensuring the capability of providing tight tolerances on its inner surface. This reduced weight translates into reduced rotational inertia, which can result in reduced energy consumption associated with its rotation. This translates into reduced emissions and/or increased fuel economy for the vehicle in which it is employed.

The first bearing member 26 rotatably supports the pulley 24 on the hub 22 at a first (proximal) axial end 44 of the pulley 24. The first bearing member 26 may be any suitable type of bearing member, such as a bushing. In cases where it is a bushing it may be made from nylon-4-6 or for some applications it could be PX9A which is made by DSM in Birmingham, Mich., USA, or some other suitable polymeric material, and may be molded directly on the pulley 24 in a two step molding process in embodiments wherein a molded pulley is provided. In such a case, the bearing could be inserted into a mold cavity and the pulley 24 could be molded over the bearing 26. Instead of a polymeric bushing, a metallic (e.g. bronze) bushing may be provided, which can be inserted into a mold cavity for the pulley molding process in similar fashion to the aforementioned bearing. The first bearing member 26 could alternatively be a bearing (e.g. a ball bearing, or a roller bearing).

The second bearing member 27 is positioned at a second (distal) axial end 46 of the pulley 24 so as to rotatably support the pulley 24 on a pulley support surface 48 of the hub 22. The second bearing member 27 may be any suitable type of bearing member such as a ball bearing, a roller bearing, or a bushing.

Figure 4B:
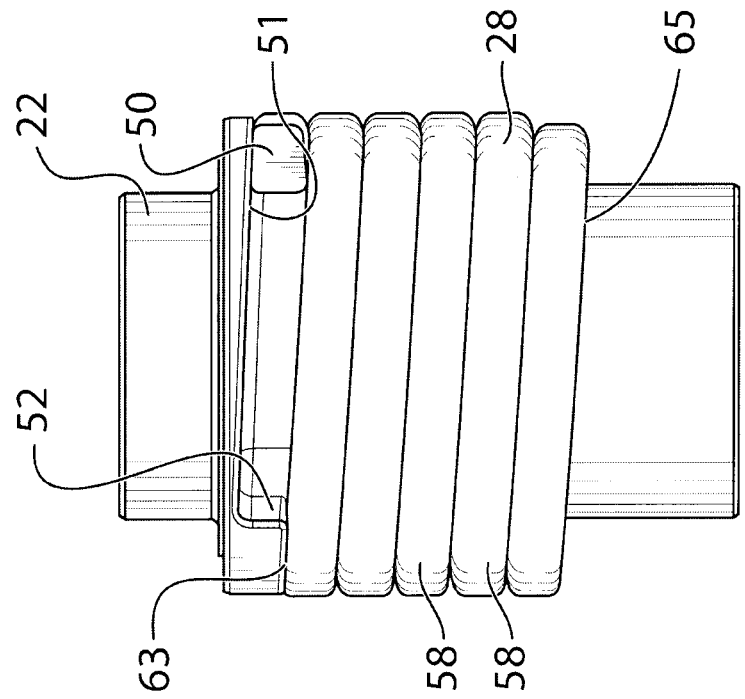
FIG. 4b is a side view of the portion of the decoupler assembly shown in FIG. 4a, in a state where the hub is overrunning the pulley of the decoupler assembly.
Figure 4A:
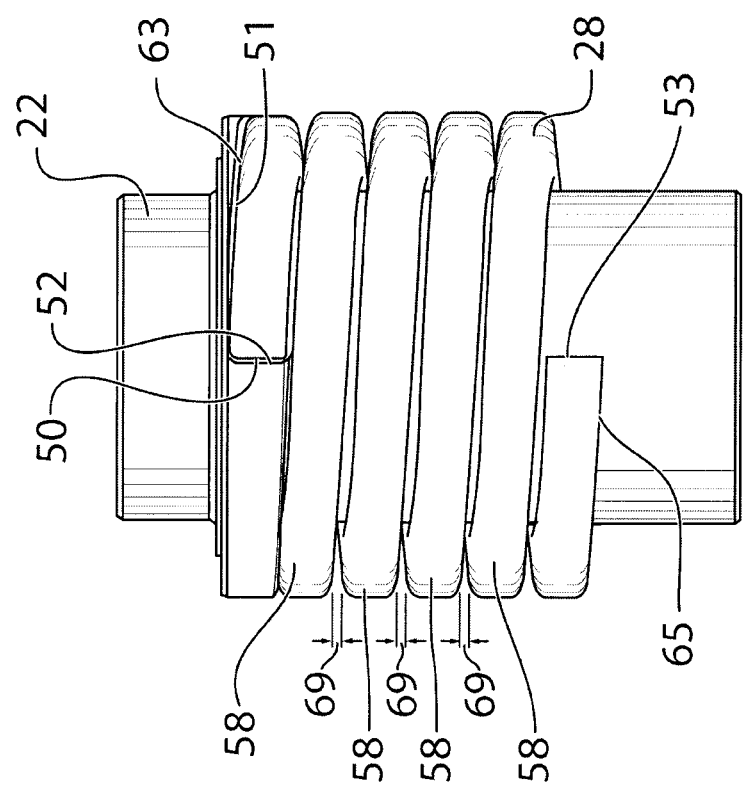
FIG. 4a is a side view of a portion of the decoupler assembly shown in FIG. 1, in a state where the pulley is overrunning the hub of the decoupler assembly.

The isolation spring 28 is provided to accommodate oscillations in the speed of the belt 14 relative to the shaft 15. The isolation spring 28 may be a helical torsion spring that has a first helical end 50 that abuts a radially extending driver wall 52 (FIG. 4a) and a first helical axial face 63 that is engaged with a first helical axial shoulder 51 on the hub 22 (FIGS. 4a and 4b). The isolation spring 28 has a second helical end 53 (FIG. 3) that engages a radially extending driver wall 54 on the pulley 24, and a second helical axial face 65 that is engaged with a second helical axial shoulder 67.

In the embodiment shown, the isolation spring 28 has a plurality of coils 58 between the first and second ends 50 and 53. The coils 58 are preferably spaced apart by a plurality of gaps 69 (FIG. 4a) and the isolation spring 28 is preferably under a selected amount of axial compression to ensure that the first and second helical ends 50 and 53 of the spring 28 are abutted with the helical axial shoulder 51 with the driver walls 52 and 54 respectively.

The first helical axial shoulder 51 and the first driver wall 52 may together be referred to as a first engagement structure. The second helical axial shoulder 67 and the second driver wall 54 may together be referred to as a second engagement structure.

Rotation of the pulley 24 in a first rotational direction relative to the hub 22 drives rotation of the hub 22 through the torsion spring 28. Rotation of the hub 22 in the first direction relative to the pulley 24 generates relative rotation between the torsion spring 28 and the helical first axial shoulder 51 which causes axial compression of the torsion spring 28 between the first and second axial shoulders 51 and 67. The plurality of gaps 69 are sized to provide a selected amount of axial compression of the torsion spring 28 when the decoupler assembly 20 is in a rest state.

The isolation spring 28 may be made from any suitable material, such as a suitable spring steel. The isolation spring 28 may have any suitable cross-sectional shape. In the figures, the isolation spring 28 is shown as having a rectangular cross-sectional shape, which provides it with a relatively torsional resistance (i.e. spring rate) for a given occupied volume. A suitable spring rate may be obtained with other cross-sectional shapes, such as a circular cross-sectional shape or a square cross-sectional shape. This may be advantageous in that it may reduce the cost of the isolation spring as compared to one made from a wire having a rectangular cross-section.

During use, when the pulley 24 is being driven by the belt 14, the pulley 24 drives the rotation of the alternator shaft (or shaft from another other accessory through the engagement of the torsion spring 28 with the first and second driver walls 52 and 54. During a transient event such as when the engine stops, the pulley 24 will be stopped by the belt 14, but the alternator shaft 15 will continue to turn for a small period of time. As shown in FIGS. 4a and 4b, the hub 22 will rotate with the shaft 15 which will bring the first driver wall 52 away from the end 50 of the spring 28. The helical axial face 51 rotates with the hub 22 as well however, and as it rotates, it pushes the axial face 63 of the spring 28 axially proximally (FIG. 4b), thereby compressing the spring 28 axially. This continues until either: the shaft 15 stops rotating due to frictional forces, or the hub 22 rotates far enough to drive the axial compression of the spring 28 until the coils 58 all contact each other, at which point the spring 28 locks (i.e. no further axial compression is possible) and no longer permits the hub 22 to further overrun the pulley 24. In the embodiment shown in FIGS. 4a and 4b, there is a selected relative angle between the hub 22 and pulley 24 at which the spring 28 locks up. This means that the decoupler 20 provides less than 360 degrees of relative movement by the hub 22 relative to the pulley 24. The particular amount of relative movement available prior to spring lock up can be selected however, based on the size of the gaps 69. In particular, the amount of relative movement available can be selected to exceed the amount needed for most situations. It has been determined that under many circumstances, there is less than 70 degrees of relative movement between the hub and the pulley in a decoupler. Thus, if the amount of relative movement available is selected to be greater than about 70 degrees then many circumstances could be handled by the decoupler 20. It will be noted that the amount of relative movement prior to spring lock up could be selected to be any amount up to 360 degrees, or even more in some embodiments. In one particular embodiment the amount of relative movement available is less than approximately 360 degrees and is more preferably less than about 350 degrees.

The sizing of the gaps 69 may be selected so that there is enough clearance to prevent the spring 28 from locking up even if there was a full 360 degrees of relatively rotation by the hub 22 with respect to the pulley 24.

Figure 5B:
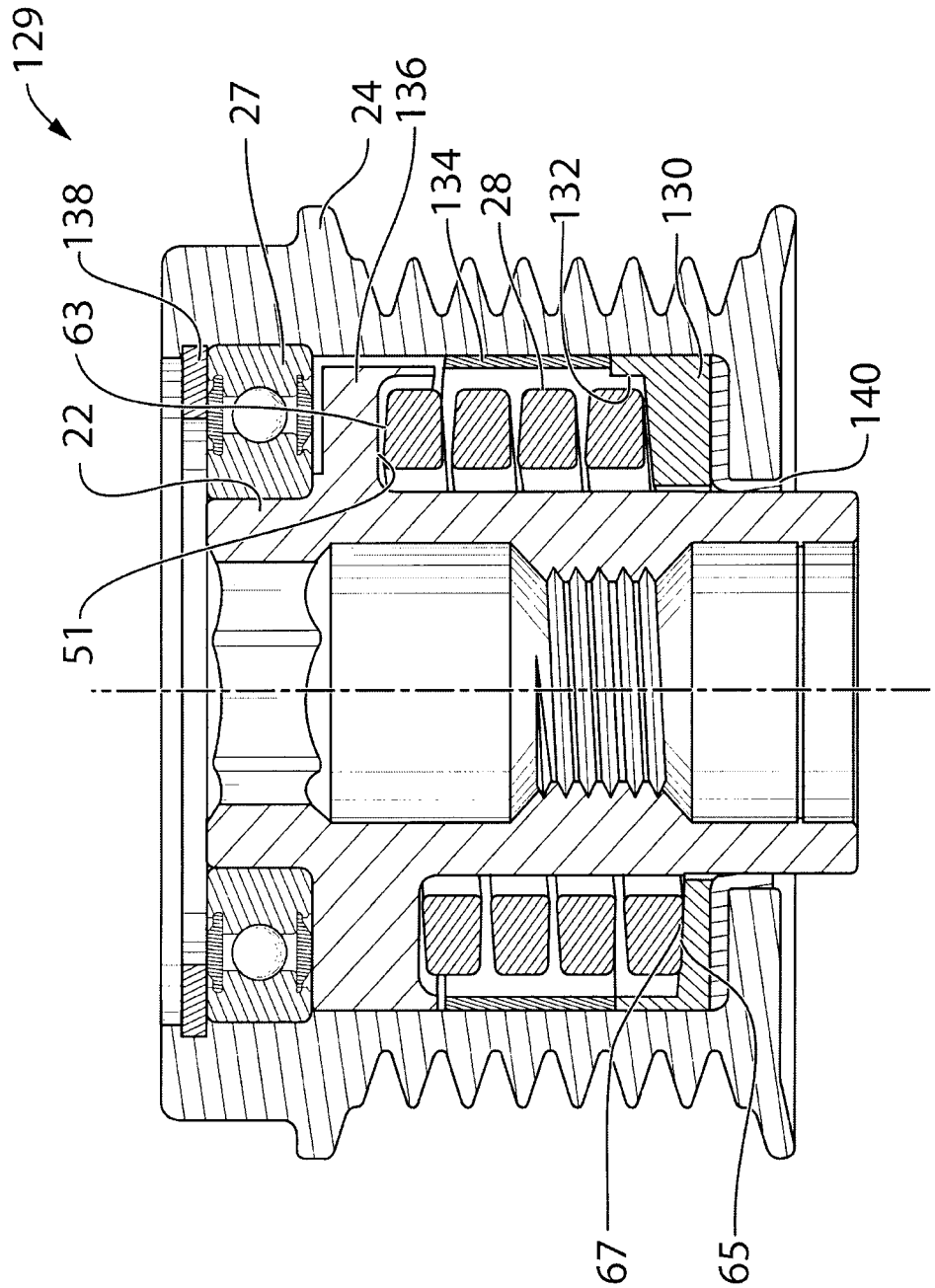
Figure 5D:
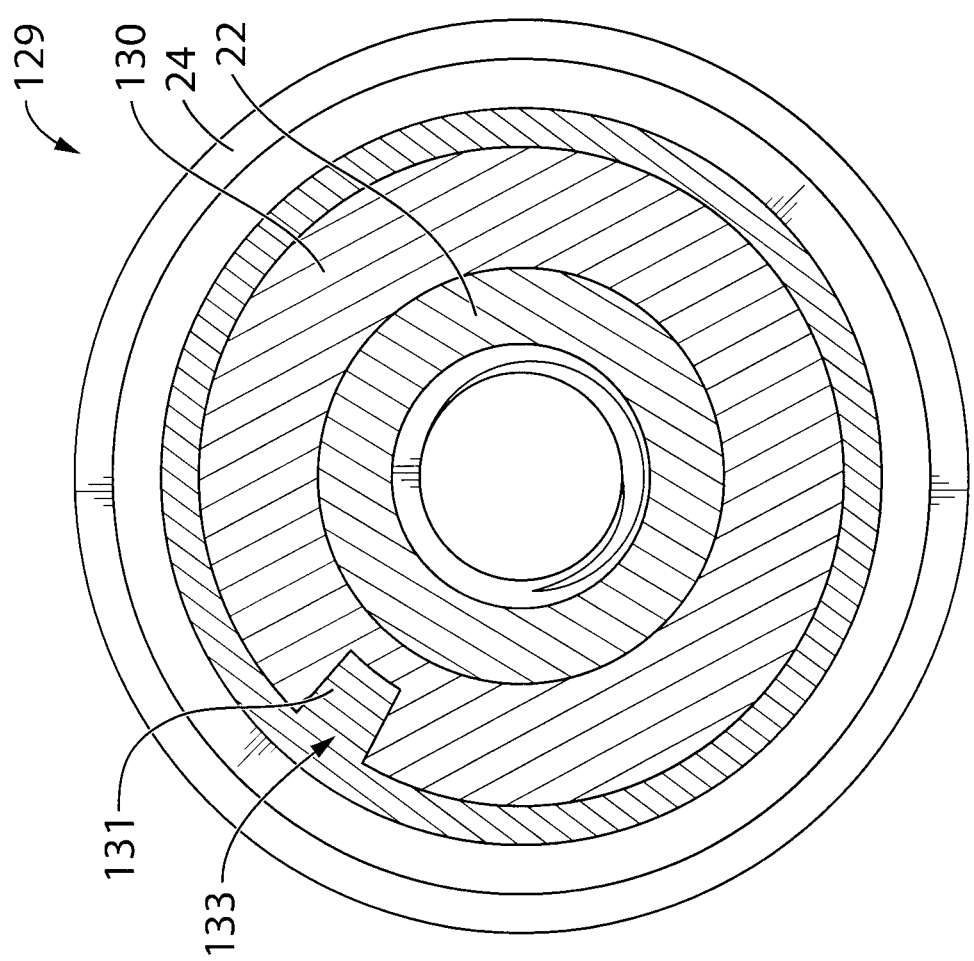
FIG. 5d is a sectional end view of the decoupler assembly shown in FIG. 5b.

Reference is made to FIGS. 5a and 5b, which show a decoupler assembly 129 which is similar to the decoupler assembly 20 but which includes means for damping oscillations transferring through the spring 28 (e.g. from the pulley 24 to the hub 22), and also includes means for limiting the amount of torque that the spring 28 has to handle on its own. In the embodiment shown in FIGS. 5a and 5b, a separate carrier 130 is provided between the spring 28 and the pulley 24. The carrier 130 may be made from any suitable material such as a polymeric material. The carrier 130 may be fixedly connected rotationally to the pulley 24 by means of a key, a press-fit, a spline or any other suitable structure. A key 131 that is integral with the pulley 24 is shown engaged with a keyway 133 in the carrier 130 in FIG. 5d. The carrier 130 may have the second engagement structure thereon. As the spring 28 expands during use, it may expand sufficiently to rub against a damping surface 132 on the carrier 130. When this occurs, some damping occurs when there are differences in speed between the spring 28 and the pulley 24.

Also shown in FIGS. 5a, 5b and 5c, is a sleeve 134. The sleeve 134 may be in contact with the inner surface of the pulley 24 but may be unconnected to it (i.e. the sleeve 134 may be capable of movement relative to the pulley 24). The sleeve 134 may have any suitable structure. For example, in the embodiment shown, the sleeve 134 is a nearly complete cylindrical shape, as shown in FIG. 5c. In another embodiment the sleeve 134 may be shaped like a coil spring. In yet another embodiment, the sleeve 134 may be in the form of a complete cylinder. The sleeve 134 surrounds the spring 28 and limits the amount of radial expansion that is available to the spring 28. If a torque that is sufficiently large is applied through the spring 28, the spring 28 will expand sufficiently to engage the sleeve 134. As shown in FIGS. 5a and 5b, the sleeve 134 is engaged with the inner surface of the pulley 24 and so once the spring 28 engages the sleeve 134, the spring 28 can expand no further radially. Any greater torque applied through the spring 28 is then supported by the sleeve 134. In this way, the sleeve 134 limits the amount of torque that the spring 28 is required to handle on its own. Furthermore, the engagement of the spring 28 with the sleeve 134 and the sleeve 134 with the inner surface of the pulley 28 acts to dampen oscillations that are transmitted through the spring 28. The sleeve 134 may be made from any suitable material, such as a plastic material (e.g. nylon), or a metal (e.g. steel). In embodiments wherein the sleeve 134 is provided it may simply 'float' axially between the carrier 130 and an analogous portion 136 on the hub 22.

As shown in FIGS. 5a and 5b, the decoupler assembly 129 further includes a retainer 138 which captures the bearing member 27. Also, as shown in FIGS. 5a and 5b, the bearing member 26 is shown as a bushing 140 which is positioned radially between the pulley 24 and the hub 22, and which is also positioned axially between the pulley 24 and the carrier 130.

Figure 8A:
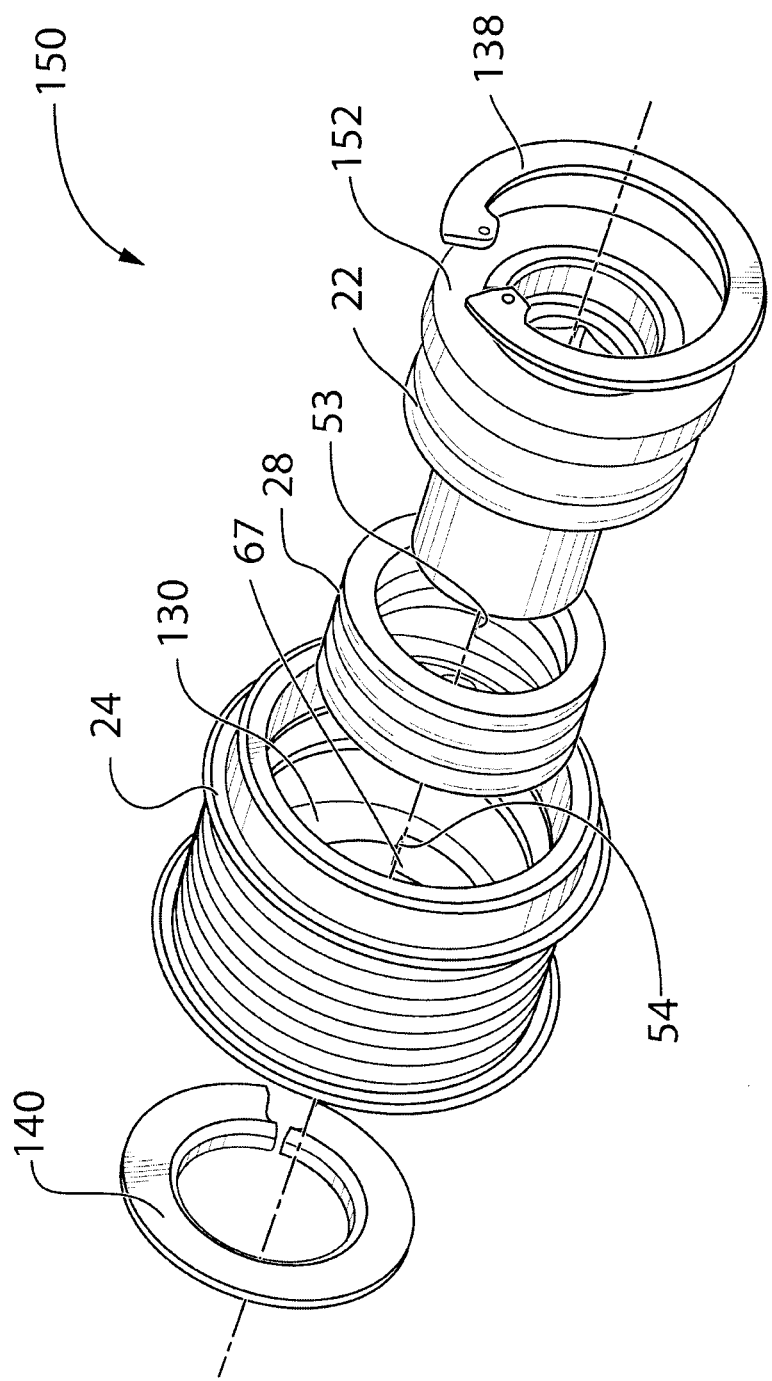
FIG. 8a is a perspective exploded view of a decoupler assembly in accordance with an alternative embodiment of the present invention.
Figure 8B:
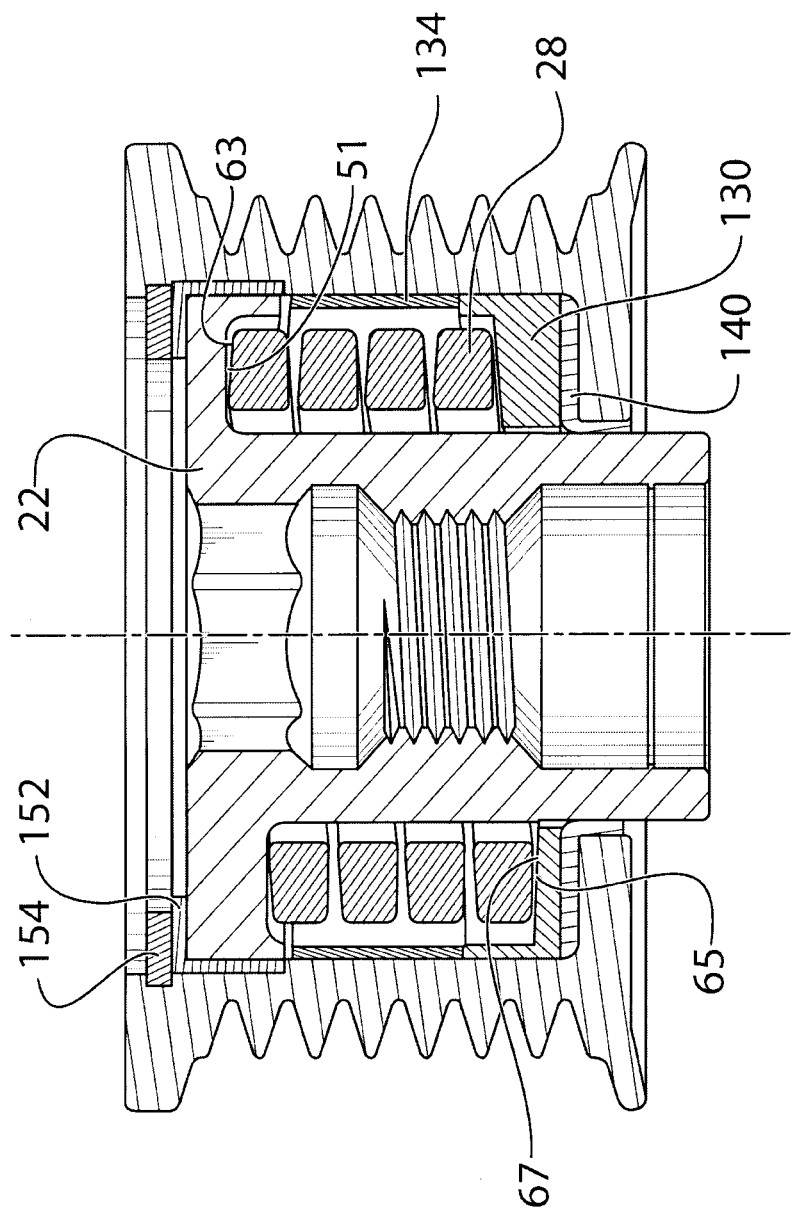

Reference is made to FIGS. 8a and 8b, which show a decoupler assembly 150 in accordance with yet another embodiment of the present invention, which may be similar to the decoupler assembly 129, but which includes a further means for damping oscillations. In the decoupler assembly 150 the bearing member 27 is a bushing 152, not a ball bearing. The bushing 152 is positioned radially between the hub 22 and the pulley 24, and is also positioned axially between the distal end of the hub 22 and the retainer shown at 154. The bushing 152 provides additional damping to the decoupler assembly 150 as compared to the damping provided in the decoupler assembly 129.

Figure 9:
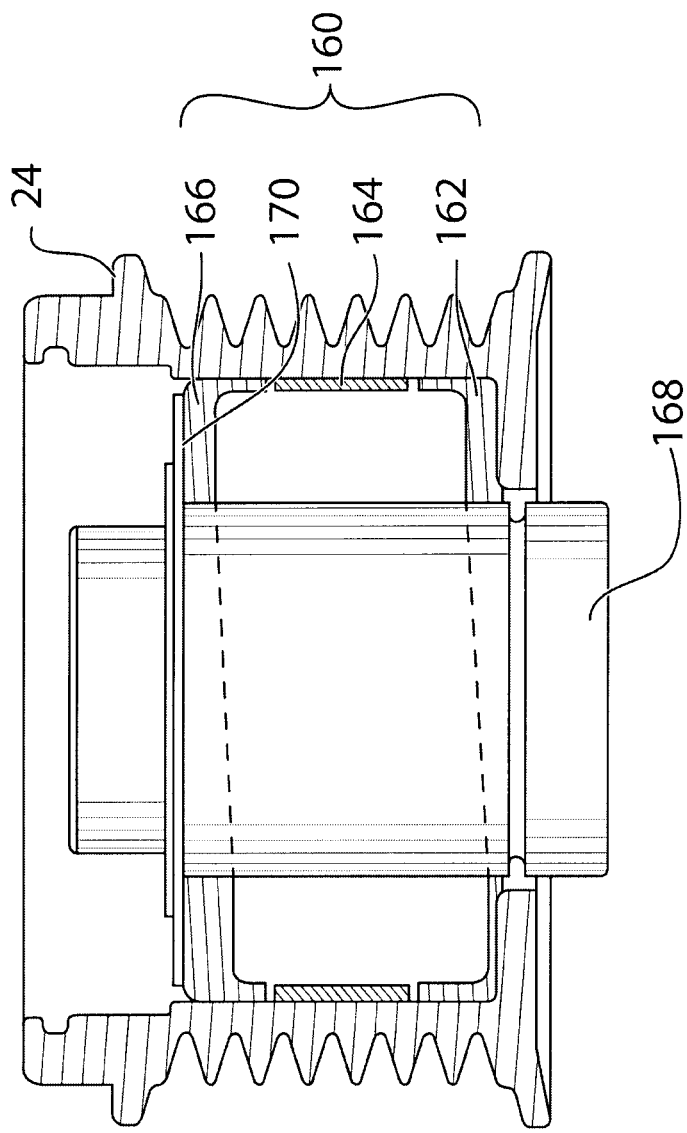
FIG. 9 is a sectional side view of a cartridge for use with a decoupler assembly in accordance with an alternative embodiment of the present invention.

Reference is made to FIG. 9, which shows a cartridge 160 that may be used during assembly of the decoupler assembly. The cartridge 160 may be made up of a pulley-associated carrier 162, a sleeve 164 and a hub-associated carrier 166. The three components 162, 164 and 166 may be assembled together and held together with the spring 28 (not shown in this figure) captured therein, by a robot or by an assembly line worker and may be mounted all together onto the hub shown at 168. The hub-associated carrier 166 may sit on a support surface 170 on the hub 168. A key that extends in a keyway (similar to that shown in FIG. 5d) in the support surface 170 may be provided. A similar arrangement may be provided between the pulley 24 and the carrier 162. Bearing members for supporting the pulley 24 on the hub are not shown, but would be provided.

Figure 10:
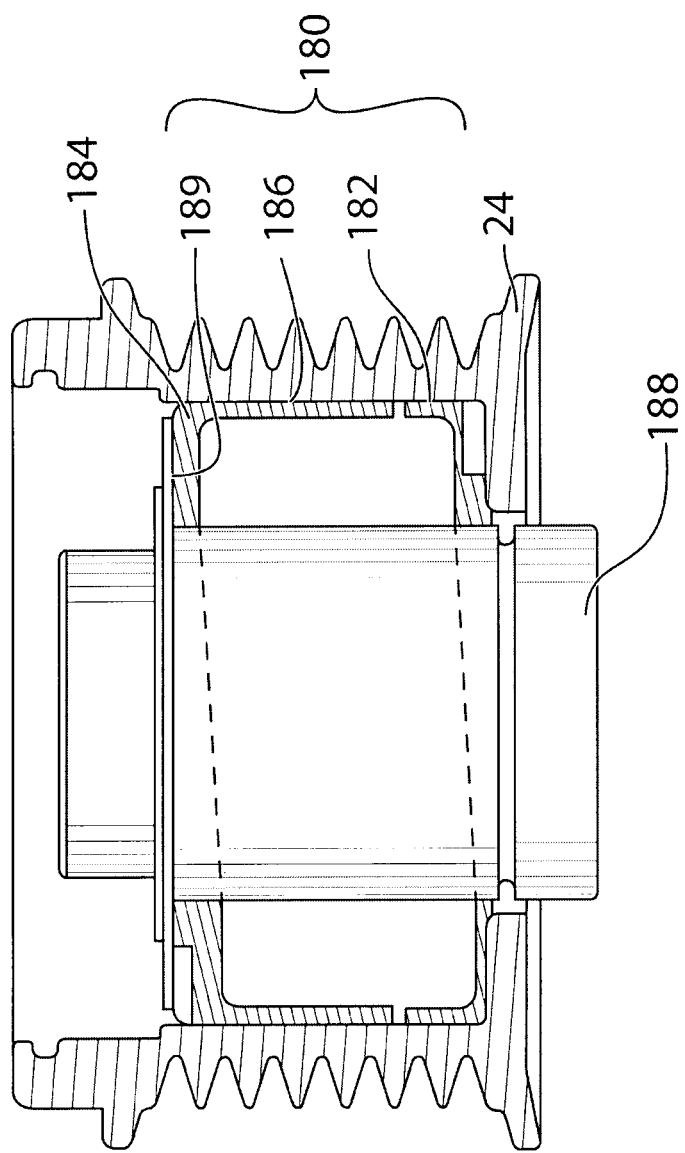
FIG. 10 is a sectional side view of a cartridge for use with a decoupler assembly in accordance with an alternative embodiment of the present invention.

Reference is made to FIG. 10 which shows a cartridge 180 that may be similar to the cartridge 160, except that the cartridge 180 includes only two components: a pulley-associated carrier 182 that may be keyed, for example, to the pulley 24, and a hub-associated carrier 184 that includes a sleeve portion, shown at 186 that may be keyed to a support surface 189 on the hub shown at 188. Bearing members for supporting the pulley 24 on the hub are not shown, but would be provided.

Reference is made to FIG. 11 which shows a cartridge 190 that may be similar to the cartridge 180 except that the hub-associated and pulley-associated carriers, shown at 192 and 194 respectively, are connected together by a clip connection or the like, shown at 196. The clip connection 196 holds the cartridge 190 together for easy transport and handling by an assembly line worker or by a robot during manufacturing of the decoupler assembly. Once the cartridge 190 is mounted onto the hub, shown at 198, the pulley-associated and hub-associated carriers 192 and 194 may be disconnected from each other by any suitable means. For example as shown in FIG. 11a rotation of the two carriers 192 and 194 relative to each other may slide the two clip elements shown at 200 and 202 apart so that they no longer overlap, permitting the spring 28 to push the two carriers 192 and 194 apart (the spring 28 may be in compression when the two carriers 192 and 194 are clipped together). During use, the two carriers 192 and 194 would remain sufficiently separated that they would not be at any significant risk of rejoining together. Bearing members for supporting the pulley 24 on the hub are not shown, but would be provided.

Reference is made to FIG. 12, which shows a decoupler assembly 210 in accordance with another embodiment of the present invention. In the decoupler assembly 210, the first engagement structure includes a helical axial shoulder 212 on the hub shown at 214, which engages a first axial end 216 of a hub-associated carrier 218. The carrier 218 is engaged with the spring 28 for co-rotation therewith. A driver wall shown at 220 in FIG. 12a on the hub 214 engages a corresponding wall 222 on the carrier 218. When the hub 214 overruns the pulley 24, the relative rotation of the hub 214 (and therefore the helical axial shoulder 212) with respect to the carrier 218 compresses the spring 28 (not shown in this figure) axially so as to permit the overrun in similar fashion to that described elsewhere herein. A sleeve is shown at 224 and a pulley-associated carrier is shown at 226. Bearing members for supporting the pulley 24 on the hub are not shown, but would be provided.

During use of a decoupler assembly according to at least some of the embodiments described above, it can be seen that the damping force (i.e. the frictional force) is at least in part dependent on the axial force exerted by the spring 28. In such embodiments, as the spring 28 is axially compressed by rotation of the first engagement surface, the axial force exerted by the spring 28 increases and so the damping force provided by the decoupler assembly increases.

Damping has been described as being provided by a carrier in conjunction with a friction surface associated with the hub. It will be noted that some or substantially all of the damping may be provided in conjunction with a friction surface provided on or associated with the pulley.

As shown and described, in some embodiments, both the first and second engagement structures include driver walls and helical axial shoulders so that the spring 28 is not fixedly connected at either end to the hub or pulley. It is alternatively possible, however to fixedly connect one end of the spring 28 to the pulley or to the hub and to leave the other end of the spring not fixedly connected to the other of the hub or pulley. The unconnected end of the spring 28 may be on the hub or it may be on the pulley.

Figure 6A:
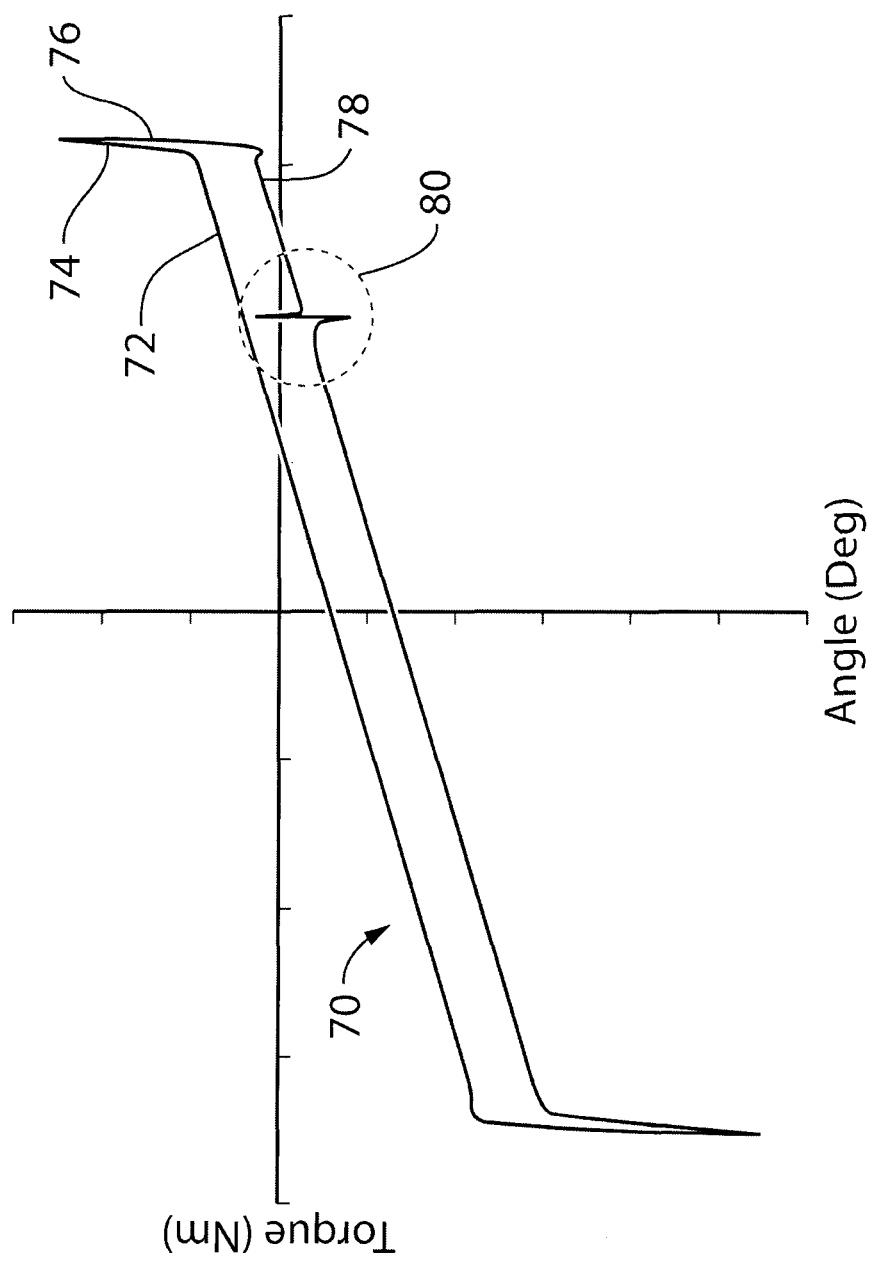
FIG. 6a is a graph illustrating the response of a prior art isolator assembly to varying torque.

In a typical (non-overrunning) isolator of the prior art, both the first and second ends of the torsion spring are fixedly connected to the hub and pulley respectively (by being bent to form tangs that engage slots in the hub and pulley). FIG. 6a illustrates the response curve 70 of such a prior art isolator. As can be seen, a first part 72 of the curve 70 shows the linear relationship between the relative angle between the hub and pulley and the torque transferred through the torsion spring. When the pulley drives the hub, for example, the torque applied by the pulley through the spring to the hub may be considered to be positive and the angular change associated with it may be considered to be positive. As the torque increases, the relative angle increases relatively linearly.

In the isolator modeled in FIG. 6a, a sleeve was provided which provides a constraint as to the maximum amount of radial expansion that the torsion spring can undergo during use. The second part of the curve shown at 74 illustrates what happens when the spring expands and is constrained by the sleeve. As can be seen the torque increases nearly vertically with essentially no change in the relative angle of the hub and the pulley. As can be seen in curve part 76, as the torque transferred is reduced, the relative angle reduces, essentially mirroring the second curve part 74. Once the spring pulls away inwardly from the sleeve, the reduction in relative angle between the hub and pulley is relatively linear and parallel to the first curve part 72. As can be seen at 78, when the hub drives the pulley (e.g. when it pulls the pulley to rotate during shutdown of the engine), the spring ends move past the rest position and transition from being pushed towards each other, to being pulled by the hub and pulley away from each other (which is considered to be a negative angular change). During this transition however, a spike can be observed in the curve. This spike occurs as the spring ends adjust in the slots from being pushed to being pulled. Repeated passing through this region of the graph during use of the isolator eventually can lead to noise, and/or yield and failure of the spring, the hub and/or the pulley. It can be seen that a similar transition region 80 may exist on the part of the curve illustrating the transition from when the hub pulls the pulley to when the pulley pushes the hub, which again contributes to wear, noise and failure of the spring, the hub and/or the pulley during use.

In general, an isolator which has both ends of the spring fixedly connected to the hub and pulley benefits greatly from a sleeve because it helps increase the operating life of the spring. More specifically, when the spring expands radially (i.e. when transferring torque) the ends of the spring, which are fixed in position, are stressed. Repeated stressing of the ends eventually can cause failure of the spring at these points due to fatigue. A sleeve improves this situation by restricting how much the spring can expand radially, however this restricts how much isolation the spring is capable of providing. By contrast, both ends of the spring 28 in at least some embodiments shown and described herein are not fixedly connected to the hub and pulley. As a result, the spring 28 is not subjected to these aforementioned stresses. As a result, the spring 28 can operate without a sleeve (so as to have a greater range of torques that it can handle while providing isolation), without risk of fatigue and failure at its ends in this way. If a sleeve is provided (as is shown in FIGS. 5a-5c for example), the sleeve may have a greater spacing from the spring 28 than would be practical for the spring in the prior art isolator described above due to the risk of fatigue and failure.

Figure 6B:
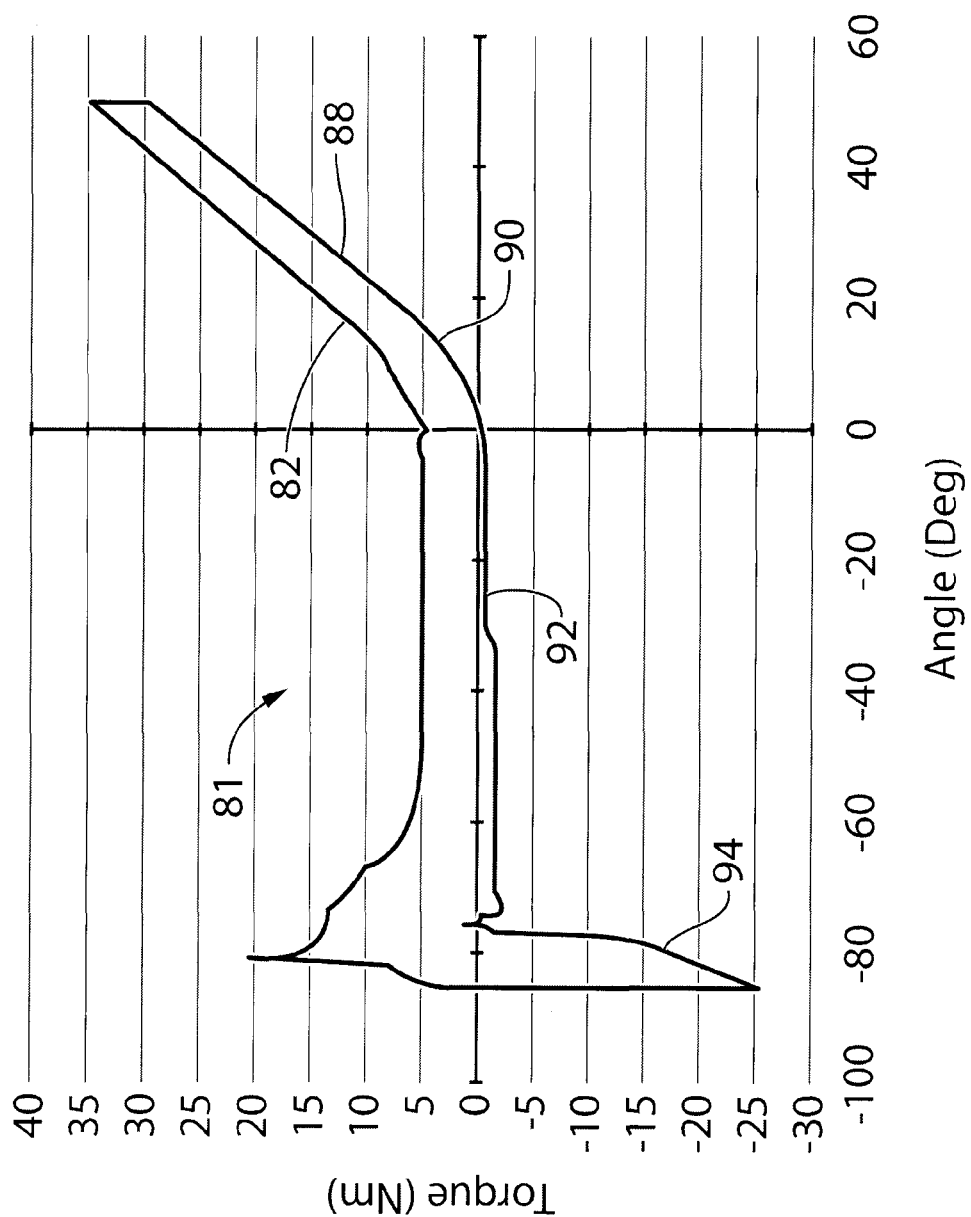
FIG. 6b is a graph illustrating the response of a decoupler assembly in accordance with an alternative embodiment of the present invention to varying torque.

FIG. 6b shows a curve 81 that illustrates the response of the decoupler 20 during use (without a sleeve). The first parts of the curve shown at 82 and 88 may be very similar to the parts 72 and 78 on the curve 70 in FIG. 6a. As can be seen, as the curve transitions (at region 90) from a situation where the pulley drives the hub to a situation where the hub overruns the pulley, the curve then extends horizontally, illustrating that there is angular displacement with no torque transfer (at portion 92). This illustrates when the first spring end 50 has separated from the driving wall 52. Eventually if the overrunning extended sufficiently long, the hub and pulley would reach a relative angle at which the spring 28 locks up (i.e. there are no remaining gaps between the coils 58), and the torque would increase (in the negative direction) with essentially no change in relative angle as seen at 94. As can be seen in the curve 81, there are no spikes that occur as the spring transitions between the hub overrunning the pulley and between the pulley overrunning the hub. This is because at least one end of the spring is not fixedly connected to the hub or pulley with which it is engageable.

Figure 7F:
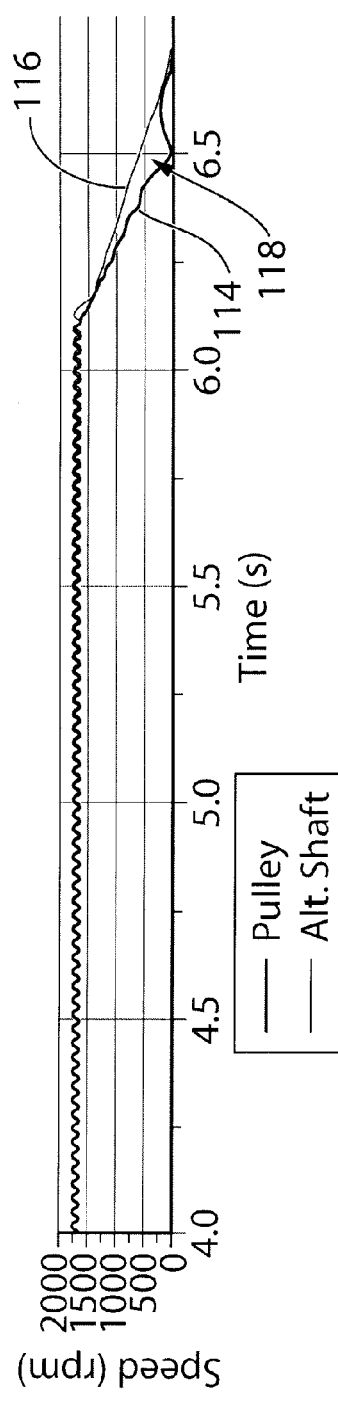

FIGS. 7a-7g illustrate a comparison of the decoupler 20 with a decoupler of the prior art that includes a one-way wrap spring clutch. The graph in FIG. 7a shows a steady state test that was carried out on both the decoupler 20 and the decoupler with the wrap spring. In this test, a sinusoidal torsional vibration was applied to the decouplers where the torque applied was 2000 Nm+/−300 Nm, at a frequency of 21.7 Hz as shown by curve 93. FIG. 7b shows the performance of the prior art decoupler with the wrap spring. The curve shown at 95 is the torque applied by the pulley. The curve shown at 96 is the torque applied to the hub. As can be seen, the torque at the hub is phase shifted in time and is lower than the torque applied at the pulley. FIG. 7c shows the performance of the decoupler 20. The curve shown at 98 is the torque applied by the pulley 24. The curve shown at 100 is the torque applied to the hub 22. As can be seen, here too the torque at the hub 22 is phase shifted in time and is lower than the torque applied at the pulley 24.

FIG. 7d is a graph that illustrates the performance of the prior art decoupler under a first type of transient condition, which is during start up of the engine. The speed of the pulley is represented by curve 102 and the speed of the hub is represented by curve 104. As can be seen in exemplary region 106, there are situations wherein the speed of the hub is greater than the speed of the pulley, (i.e. the hub is overrunning the pulley). FIG. 7e is an analogous graph for the decoupler 20. The pulley speed curve is shown at 108 and the hub speed curve is shown at 110. As can be seen in exemplary regions 112, here too the hub overruns the pulley at certain points during engine start up.

Figure 7G:
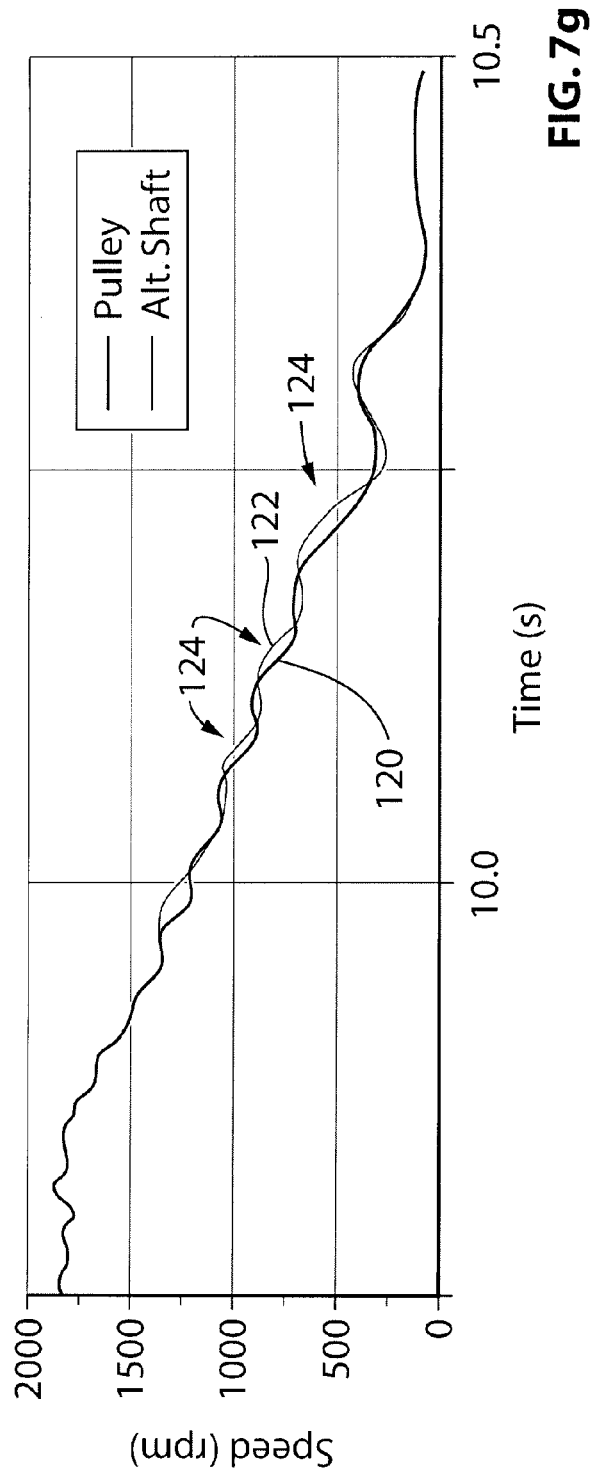

FIG. 7f illustrates the response of the prior art decoupler during another transient condition, which is engine shutdown. The pulley speed and hub speed are represented by curves 114 and 116 respectively. As can be seen, the wrap spring permits a relatively long period of overrun (about 0.4 second) by the hub relative to the pulley as shown at region 118. FIG. 7g illustrates the response of the decoupler 20 during engine shutdown. The pulley speed and hub speed are represented by curves 120 and 122 respectively. As can be seen, the hub overruns the pulley repeatedly for shorter periods of time (see at regions 124) during shutdown, somewhat mirroring the performance during a startup situation. While this may in some situations permit a chirp to be emitted due to some degree of belt slip, in many situations belt chirp is prevented and in any case whether belt chirp is present, the overall stresses on the pulley, the shaft and the belt are reduced as compared to an arrangement without any isolation or decoupling.

A particularly advantageous application for the decoupler assemblies described herein is as part of a BAS (Belt-Alternator-Start) system for the engine 10. A BAS system starts the engine by turning the crankshaft via the belt instead of via a starter motor. The belt is driven by the alternator, which is powered to operate as a motor temporarily. In such situations a prior art decoupler that is equipped with a one-way wrap spring clutch would be operable, since the clutch would prevent the hub from driving the pulley. To overcome this, some systems have been proposed whereby an electrically actuated clutch is provided which is actuated during engine startup where the hub has to drive the pulley. Such an arrangement may work, but it can be relatively expensive, relatively complex, and may occupy a relatively large space in the already cramped engine bays of many vehicles. By contrast, the decoupler assemblies described herein that lock the spring 28 within 360 degrees of relative rotation between the hub and pulley automatically permit the hub to drive the pulley and therefore do not require a complex and expensive electrically actuated clutch.

It can be seen the decoupler assemblies described herein provide some overrunning capability while doing away with the cost and complexity associated with a wrap spring and the precisely machined pulley associated therewith. In addition to the reduced cost of manufacture of the pulley there are other advantages provided by the decoupler assembly described herein. For example, in decouplers that include wrap springs that engage the inner surface of the pulley, it is difficult to efficiently change the design to accommodate a larger pulley. If the inner diameter of the pulley is changed, then the wrap spring needs to be changed and the design will potentially have to be revalidated. If the inner diameter of the pulley is not changed even though the outer diameter is increased, then the pulley becomes unnecessarily heavy. By contrast, the decoupler assemblies described herein do not need to employ a wrap spring and accordingly can easily accommodate an increase in both the outer diameter and the inner diameter of the pulley.

While the above description constitutes a plurality of embodiments of the present invention, it will be appreciated that the present invention is susceptible to further modification and change without departing from the fair meaning of the accompanying claims.

| Table of elements shown in Figures: | | |
|---|---|---|
| Element | Number | FIG. |
| Engine | 10 | 1 |
| Crankshaft | 12 | 1 |
| Pulley | 13 | 1 |
| Belt | 14 | 1 |
| Drive shaft | 15 | 1 |
| Accessories | 16 | 1 |
| Decoupler assembly | 20 | 1 |
| Hub | 22 | 2 |
| Pulley | 24 | 3 |
| First bearing member | 26 | 2 |
| Second bearing member | 27 | 2 |
| Isolation spring | 28 | 2 |
| Outer surface | 40 | 3 |
| Grooves | 42 | 3 |
| Inner surface | 43 | 3 |
| First (proximal) axial end | 44 | 3 |
| Second (distal) axial end | 46 | 3 |
| Pulley support surface | 48 | 3 |
| First helical end | 50 | 2 |
| First helical axial shoulder | 51 | 4a |
| Radially extending driver wall | 52 | 4a |
| Second helical end | 53 | 3 |
| Radially extending driver wall | 54 | 2 |
| Coils | 58 | 4a |
| First helical axial face | 63 | 4a |
| Second helical axial face | 65 | 3 |
| Second helical axial shoulder | 67 | 3 |
| Gaps | 69 | 4a |
| Response curve | 70 | 6a |
| First part of curve | 72 | 6a |
| Second part of curve | 74 | 6a |
| Curve part | 76 | 6a |
| Curve part | 78 | 6a |
| Curve | 81 | 6b |
| Curve part | 82 | 6b |
| Curve part | 88 | 6b |
| Region | 90 | 6b |
| Curve portion | 92 | 6b |
| Curve | 93 | 7a |
| Relative angle | 94 | 6b |
| Curve | 93 | 7a |
| Curve | 95 | 7b |
| Curve | 96 | 7b |
| Curve | 98 | 7c |
| Curve | 100 | 7c |
| Curve | 102 | 7d |
| Curve | 104 | 7d |
| Pulley speed curve | 108 | 7e |
| Hub speed curve | 110 | 7e |
| Exemplary regions | 112 | 7d |
| Curve | 114 | 7f |
| Curve | 116 | 7f |
| Region | 118 | 7f |
| Curve | 120 | 7g |
| Curve | 122 | 7g |
| Regions | 124 | 7g |
| Decoupler assembly | 129 | 5a |
| Carrier | 130 | 5a |
| Key | 131 | 5d |
| Damping surface | 132 | 5b |
| Keyway | 133 | 5d |
| Sleeve | 134 | 5a |
| Analogous portion | 136 | 5b |
| Retainer | 138 | 5a |
| Bushing | 140 | 5a |
| Decoupler assembly | 150 | 8a |
| Bushing | 152 | 8a |
| Retainer | 154 | 8b |
| Cartridge | 160 | 9 |
| Pulley-associated carrier | 162 | 9 |
| Sleeve | 164 | 9 |
| Hub-associated carrier | 166 | 9 |
| Hub | 168 | 9 |
| Support surface | 170 | 9 |
| Cartridge | 180 | 10 |
| Pulley-associated carrier | 182 | 10 |
| Hub-associated carrier | 184 | 10 |

-continued

Table of elements shown in Figures:

| Element | Number | FIG. |
|---|---|---|
| Sleeve portion | 186 | 10 |
| Hub | 188 | 10 |
| Support surface | 189 | 10 |
| Cartridge | 190 | 11 |
| Hub-associated carrier | 192 | 11 |
| Pulley-associated carrier | 194 | 11 |
| Clip connection | 196 | 11 |
| Hub | 198 | 11 |
| Clip element | 200 | 11 |
| Clip element | 202 | 11 |
| Decoupler assembly | 210 | 12 |
| Helical axial shoulder | 212 | 12 |
| Hub | 214 | 12 |
| First axial end | 216 | 12 |
| Hub-associated carrier | 218 | 12 |
| Driver wall | 220 | 12a |
| Corresponding wall | 222 | 12a |
| Sleeve | 224 | 12a |
| Pulley-associated carrier | 226 | 12a |

What is claimed is:

1. A decoupler assembly for transferring torque between a shaft and an endless drive member, said decoupler assembly comprising:
    a hub that is adapted to be coupled to the shaft such that the shaft co-rotates with the hub about a rotational axis;
    a pulley rotatably coupled to the hub, the pulley having an outer periphery that is adapted to engage the endless drive member;
    a helical torsion spring concentric with the rotational axis and having a first axial face and a second axial face, and having a plurality of coils which are spaced apart by a plurality of gaps;
    a first engagement structure positioned between the torsion spring and one of the hub and the pulley, wherein the first engagement structure includes a helical first axial shoulder for engaging the first axial face of the torsion spring; and
    a second engagement structure positioned between the torsion spring and the other of the hub and the pulley, wherein the second engagement structure includes a second axial shoulder engageable with the second axial face of the torsion spring,
    wherein rotation of the pulley in a first rotational direction relative to the hub drives rotation of the hub through the torsion spring, and wherein rotation of the hub in the first direction relative to the pulley generates relative rotation between the torsion spring and the helical first axial shoulder which causes axial compression of the torsion spring between the first and second axial shoulders, wherein the plurality of gaps are sized to provide a selected amount of axial compression of the torsion spring such that there is a selected finite amount of relative rotation available between the hub and the pulley prior to lock up of the spring due to elimination of the gaps from axial compression.

2. A decoupler assembly as claimed in claim 1, wherein the selected amount of compression of the torsion spring is reached in less than 360 degrees of rotation of the hub relative to the pulley.

3. A decoupler assembly as claimed in claim 1, wherein the selected amount of axial compression of the torsion spring generates a selected increase in a frictional force at the helical first axial shoulder.

4. A decoupler as claimed in claim 1, wherein the torsion spring has a first helical end and a second helical end, and wherein the first engagement structure includes a first radial shoulder and the second engagement structure includes a second radial shoulder, wherein the first and second generally radial shoulders are positioned to engage at least indirectly the first and second helical ends respectively during rotation of the pulley in the first rotational direction relative to the hub, and wherein the first radial shoulder is spaced from the first helical end during rotation of the hub in the first rotational direction relative to the pulley.

5. A decoupler as claimed in claim 1, wherein the torsion spring has a first helical end and a second helical end, and the first engagement structure includes a first radial shoulder that is engageable with the first helical end of the spring, and the second engagement structure is rotationally fixedly connected with the second helical end of the spring.

6. A decoupler as claimed in claim 1, wherein the first engagement structure is integral with the pulley and the second engagement structure is integral with the hub.

7. A decoupler as claimed in claim 1, wherein the first engagement structure is integral with the hub and the second engagement structure is integral with the pulley.

8. A decoupler as claimed in claim 1, further comprising a carrier positioned between the second helical end of the torsion spring and the other of the hub and the pulley, wherein the second engagement structure is integral with the carrier.

9. A decoupler as claimed in claim 1, further comprising a bearing positioned between the pulley and the hub.

10. A decoupler as claimed in claim 1, further comprising a bushing positioned between the pulley and the hub.

11. A decoupler as claimed in claim 1, further comprising a sleeve positioned radially outside the torsion spring and having a selected friction coefficient.

12. A decoupler as claimed in claim 1, wherein the selected amount of compression of the torsion spring is reached in more than about 50 degrees of rotation of the hub relative to the pulley.

13. A decoupler as claimed in claim 1, wherein the selected amount of compression of the torsion spring is reached in more than about 70 degrees of rotation of the hub relative to the pulley.

14. A decoupler as claimed in claim 1, further comprising a carrier positioned between the first helical end of the torsion spring and the one of the hub and the pulley, wherein the first engagement structure is integral with the carrier.

15. A decoupler as claimed in claim 1, further comprising:
    a first carrier positioned between the first helical end of the torsion spring and the one of the hub and the pulley, and
    a second carrier positioned between the second helical end of the torsion spring and the other of the hub and the pulley.

16. A decoupler as claimed in claim 15, wherein the first carrier is fixedly mounted to the one of the hub and the pulley and the first engagement structure is integral with the first carrier.

17. A decoupler as claimed in claim 15, wherein the first carrier is fixedly mounted to the torsion spring and the first carrier engages the helical axial first shoulder.

* * * * *